Dec. 22, 1936.  W. PEASLEE ET AL  2,065,151
GRINDING MACHINE
Filed Aug. 10, 1934.  12 Sheets-Sheet 1
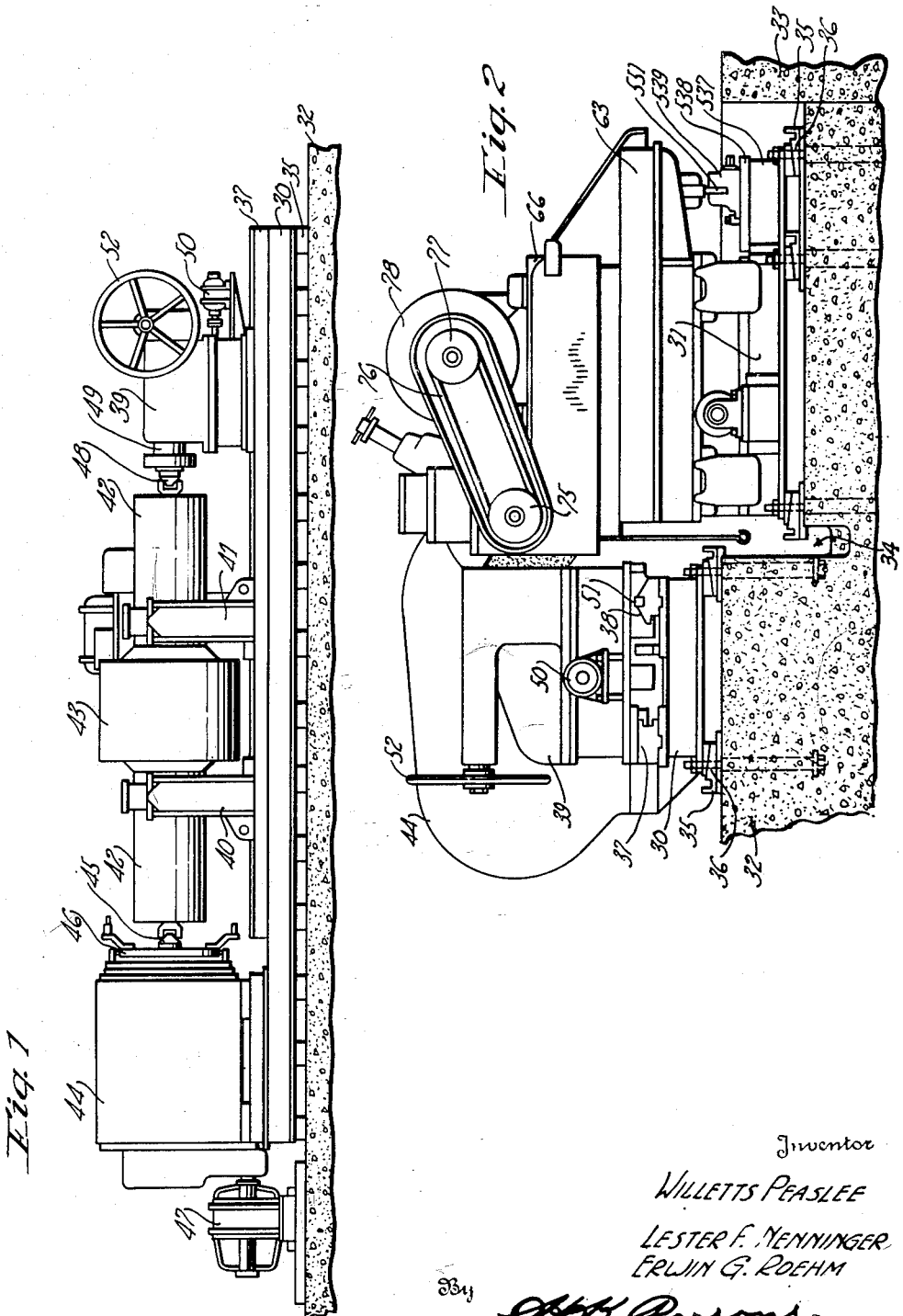
Inventor
WILLETTS PEASLEE
LESTER F. MENNINGER
ERWIN G. ROEHM
By AHK Parsons Attorney

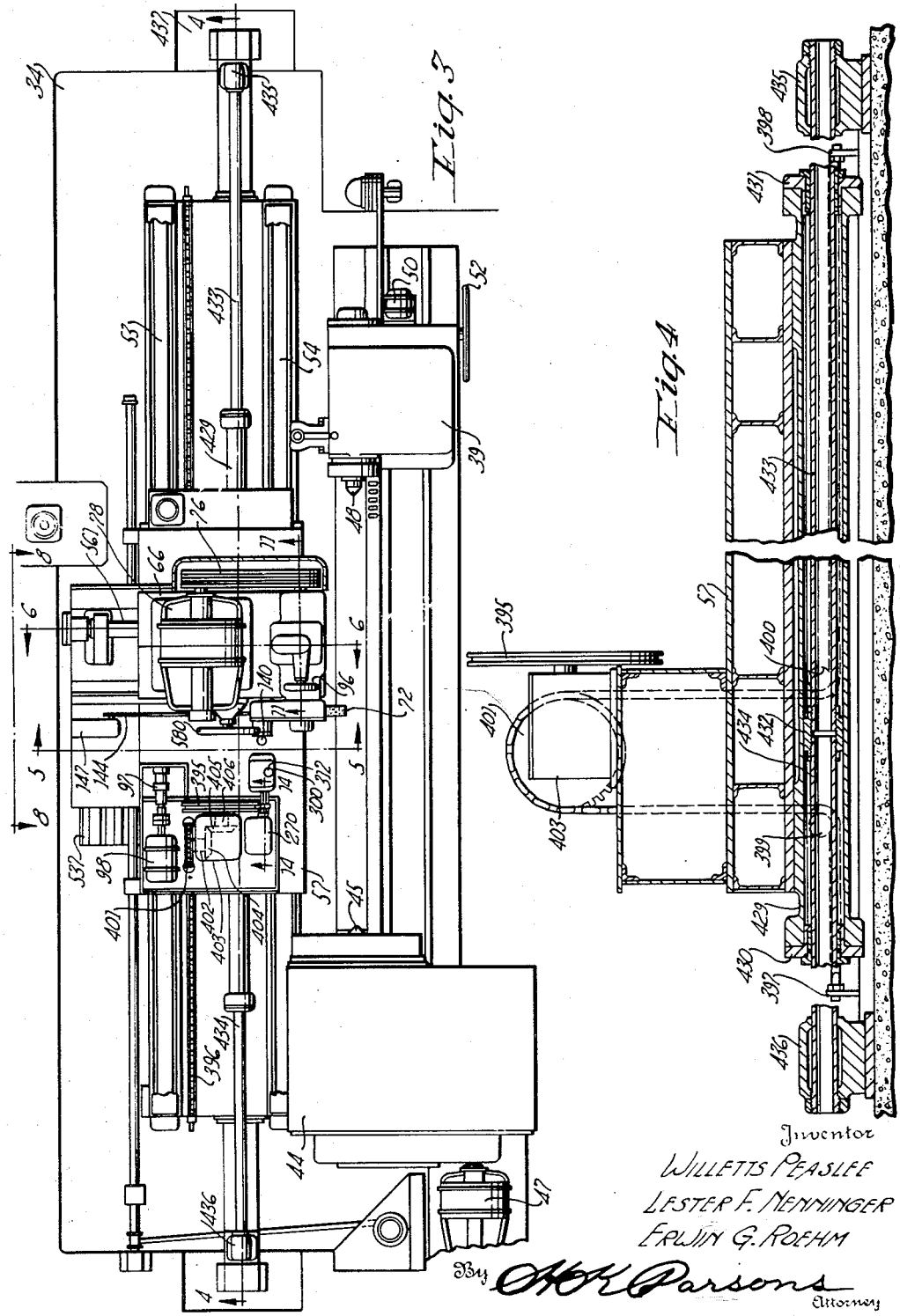

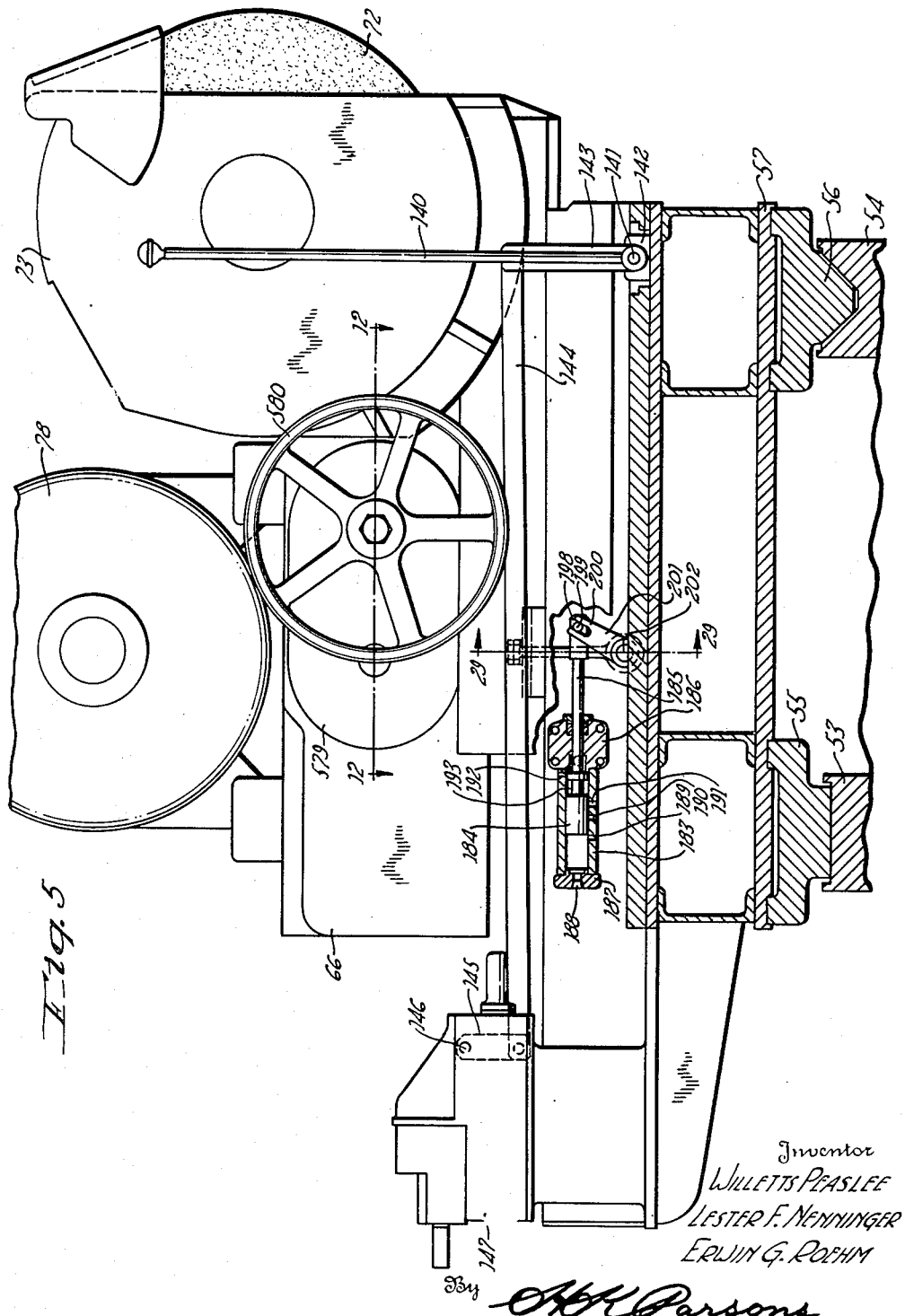

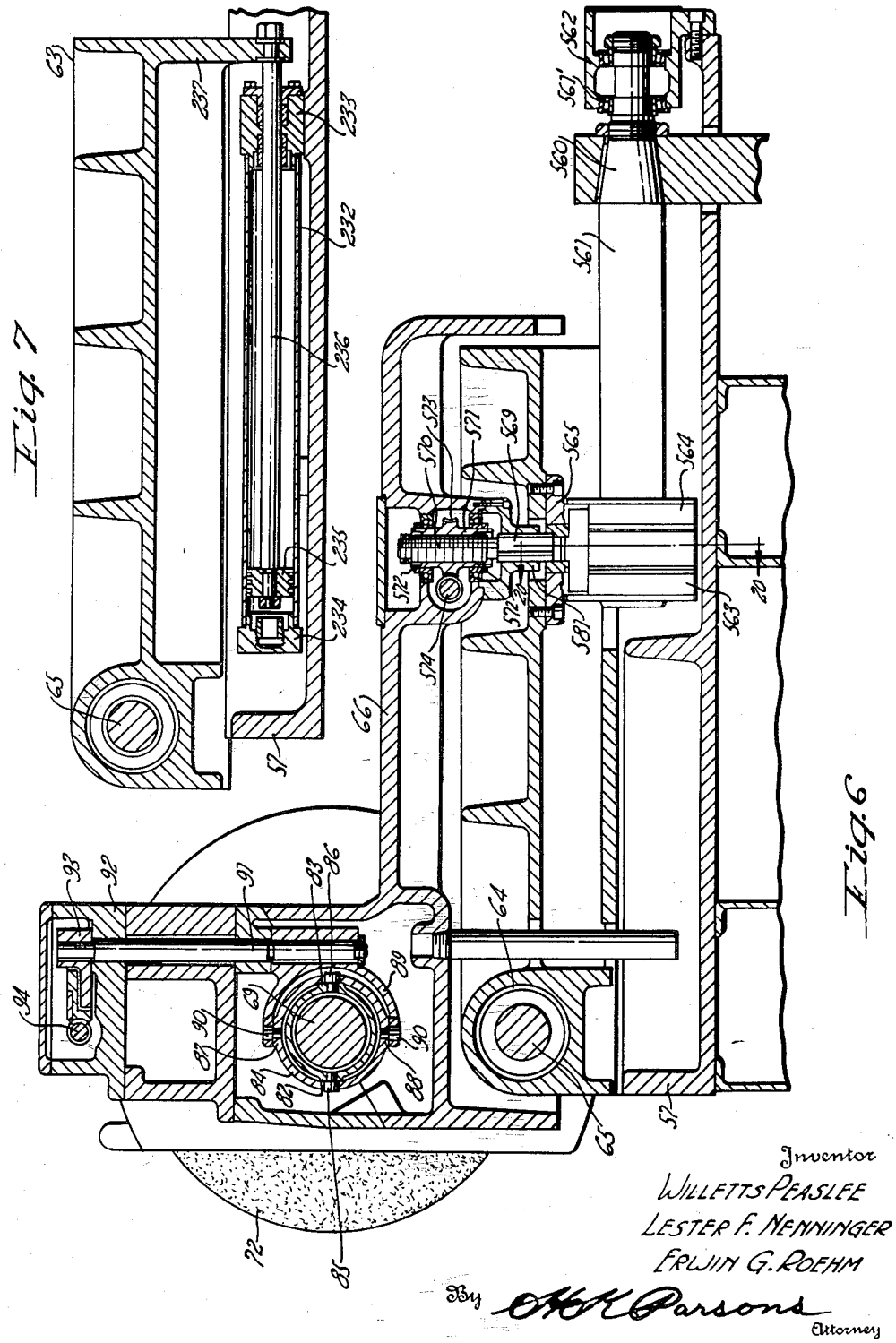

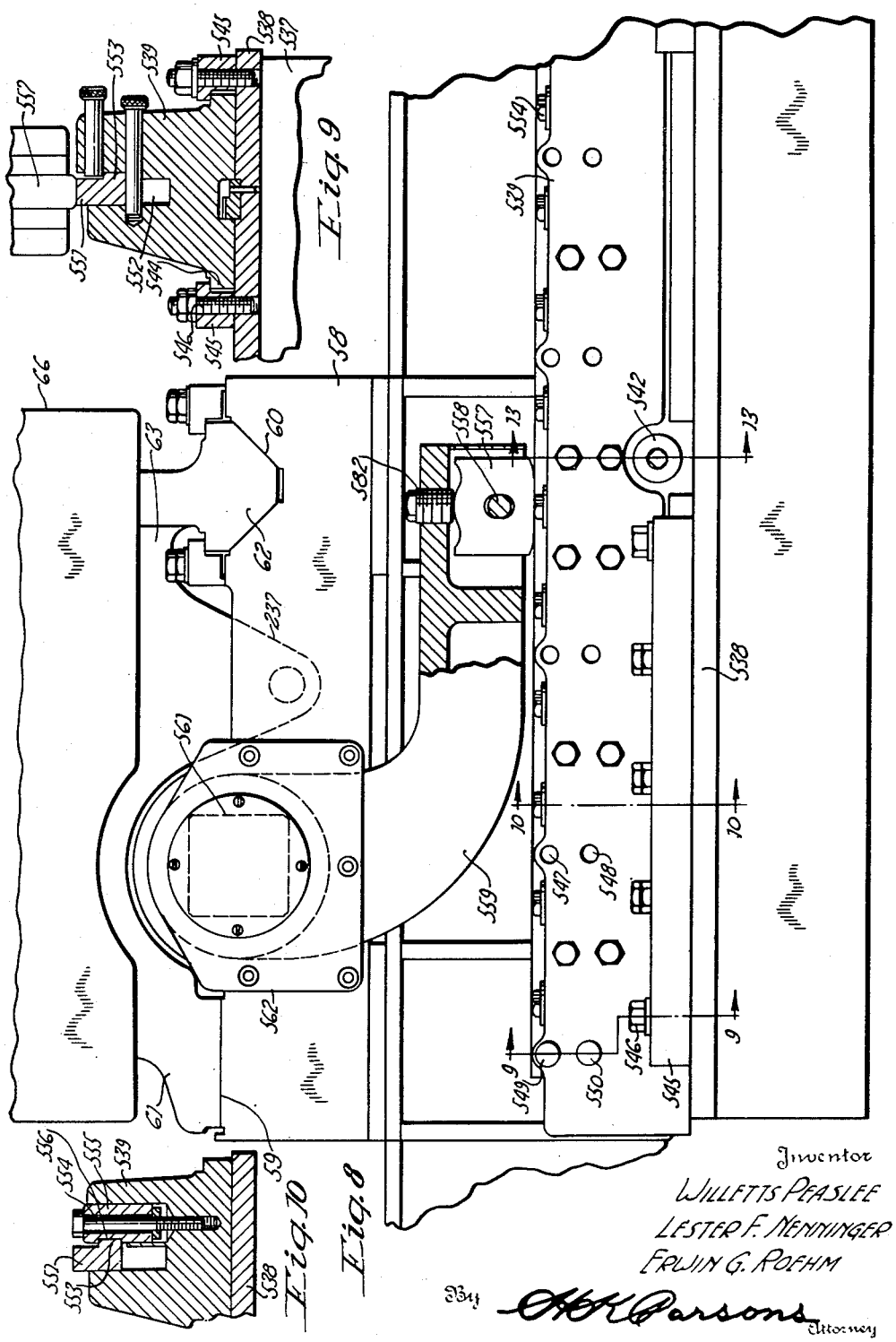

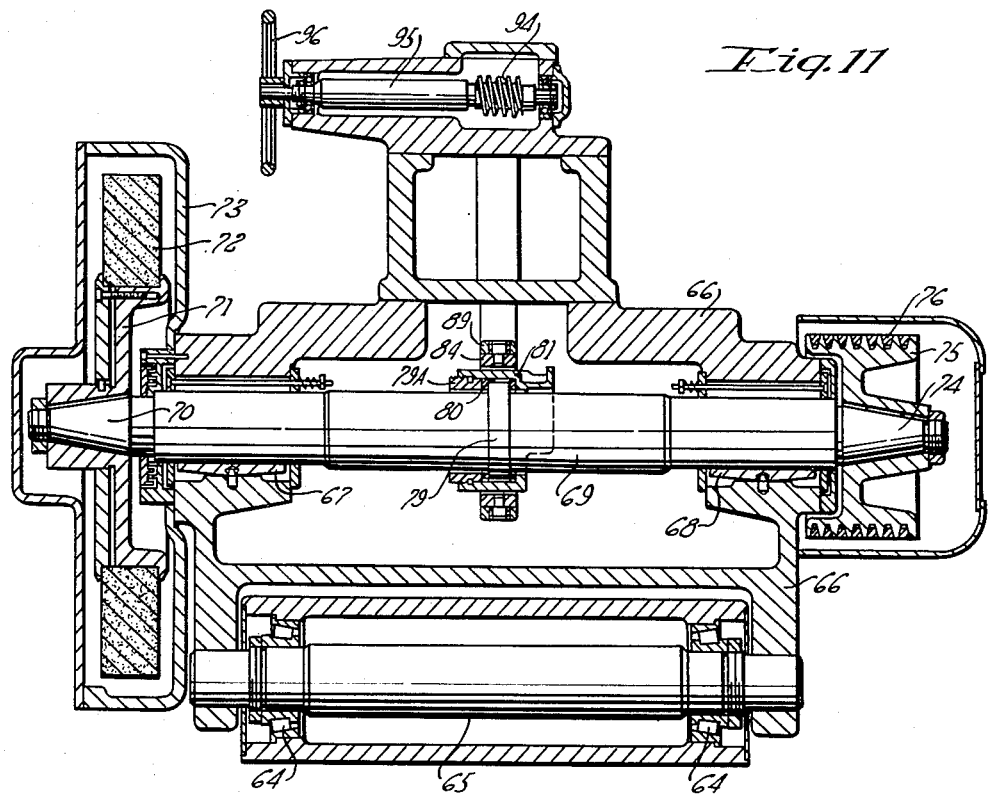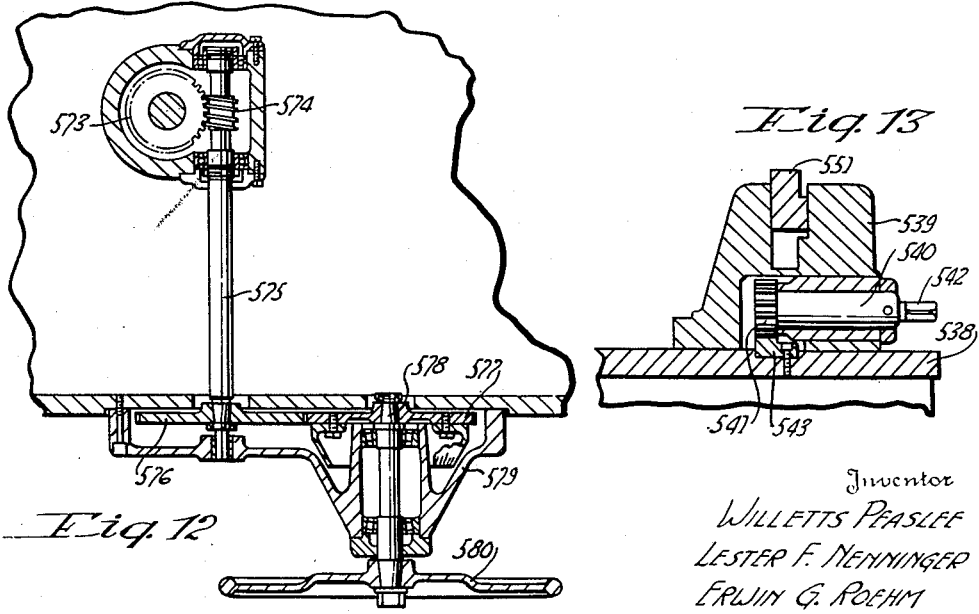

Dec. 22, 1936.  W. PEASLEE ET AL  2,065,151
GRINDING MACHINE
Filed Aug. 10, 1934   12 Sheets-Sheet 7
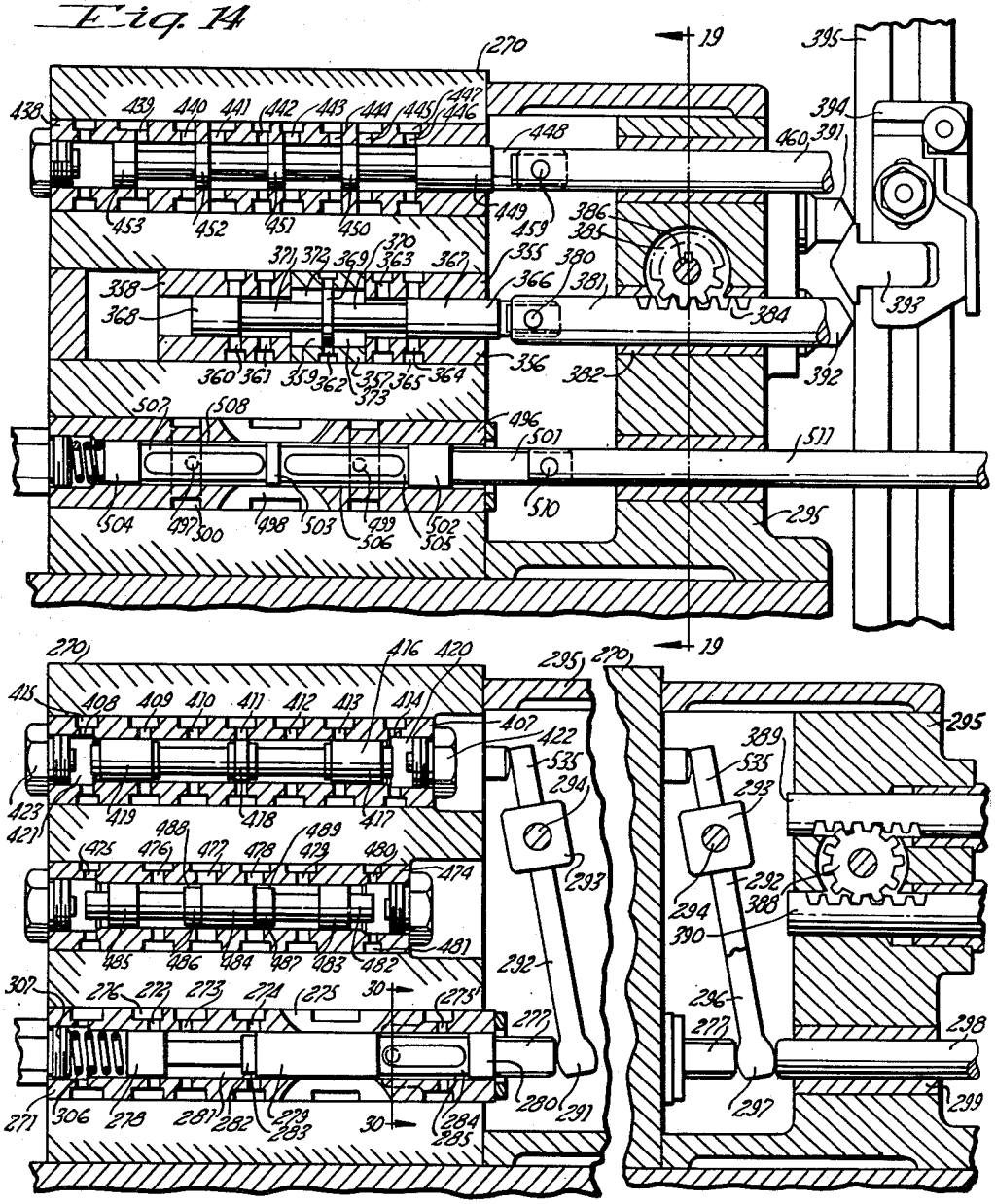
Fig. 14
Fig. 24   Fig. 23
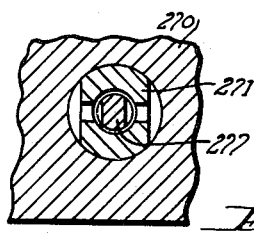
Fig. 30
Inventor
WILLETTS PEASLEE
LESTER F. NENNINGER
ERWIN G. ROEHM
By A.H.Parsons
Attorney

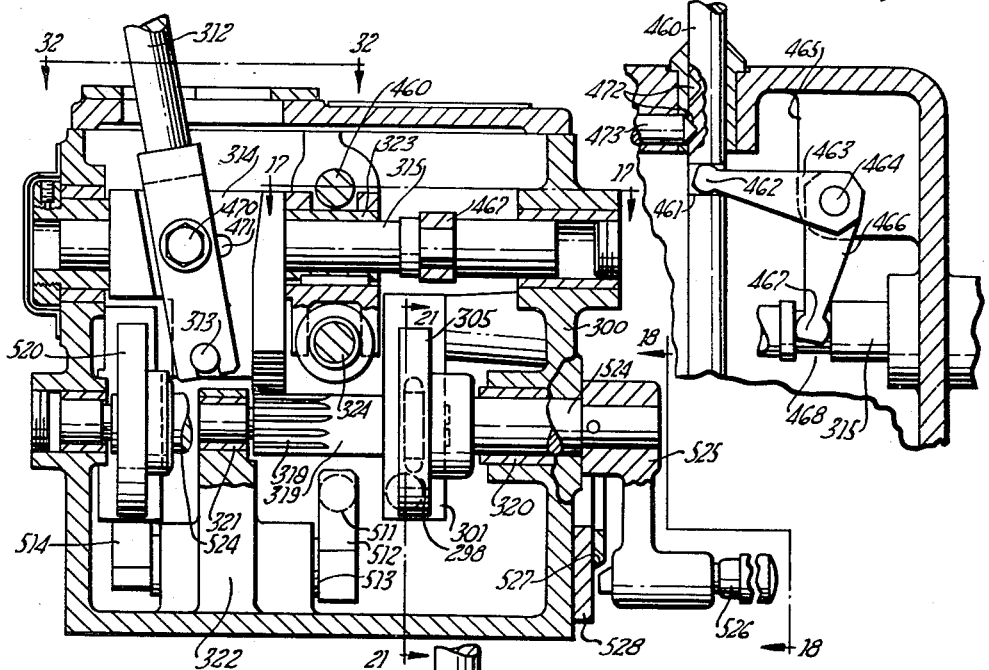
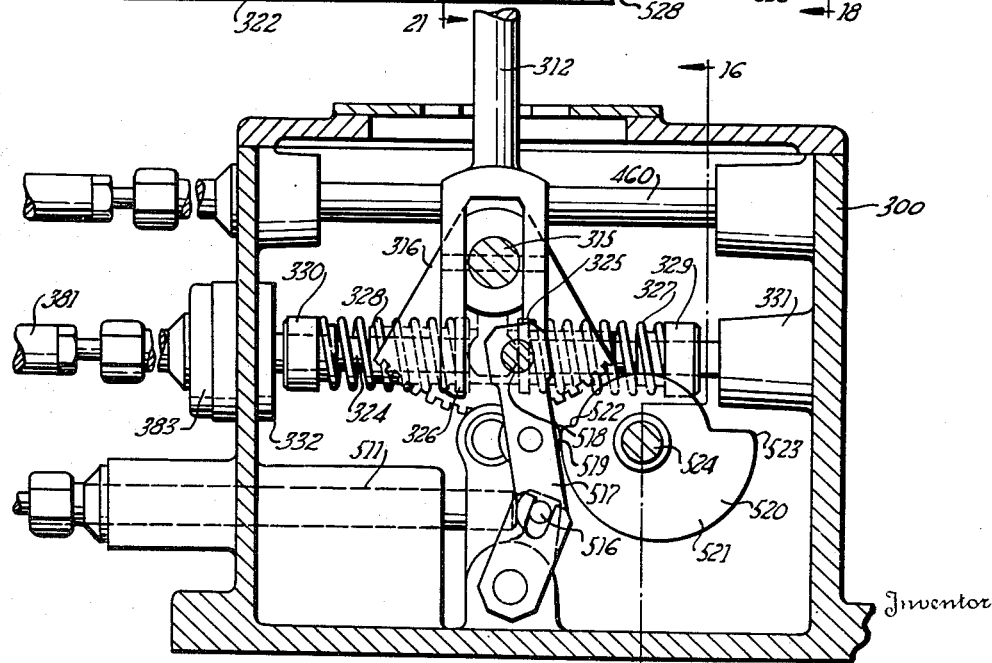

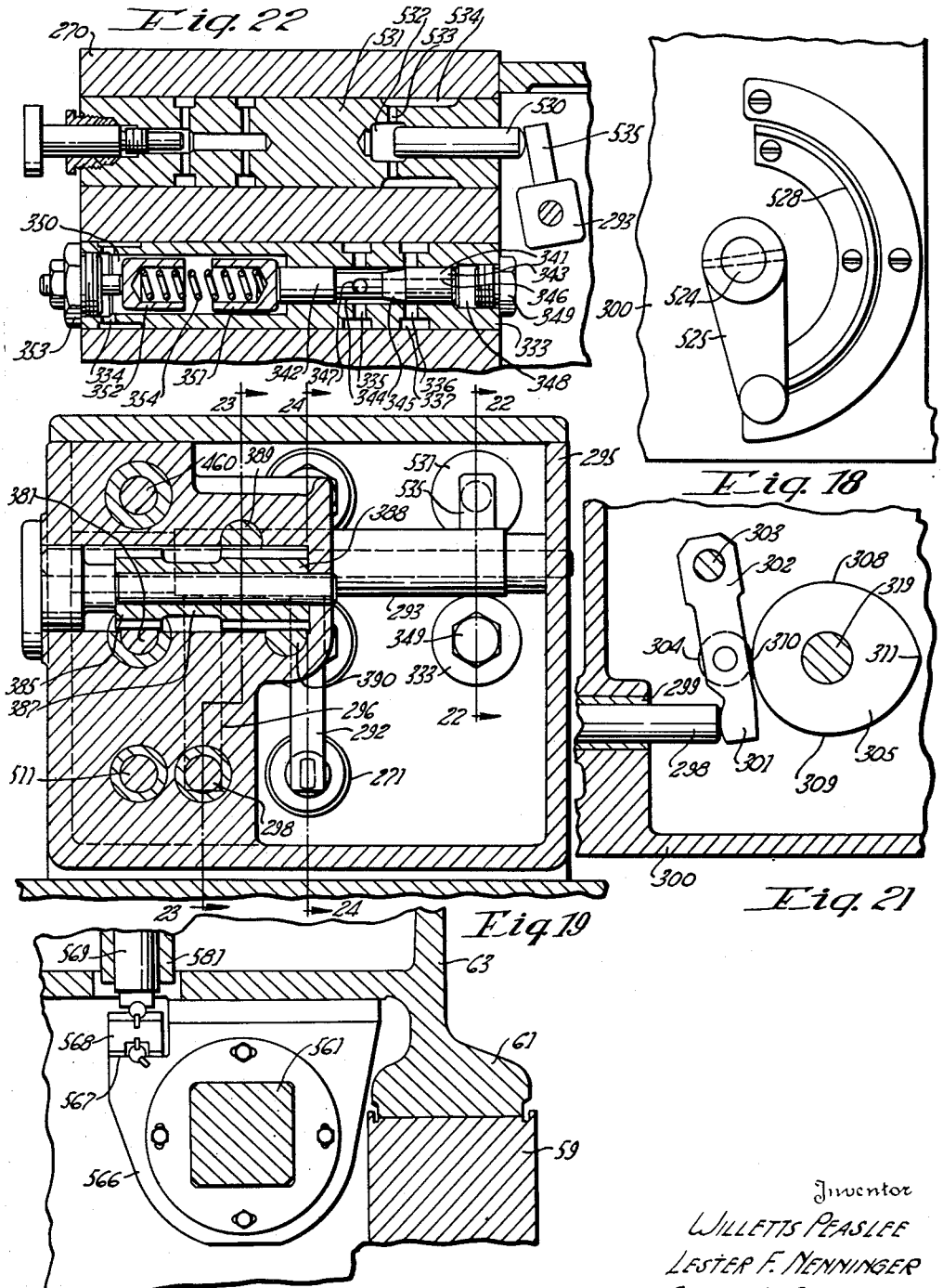

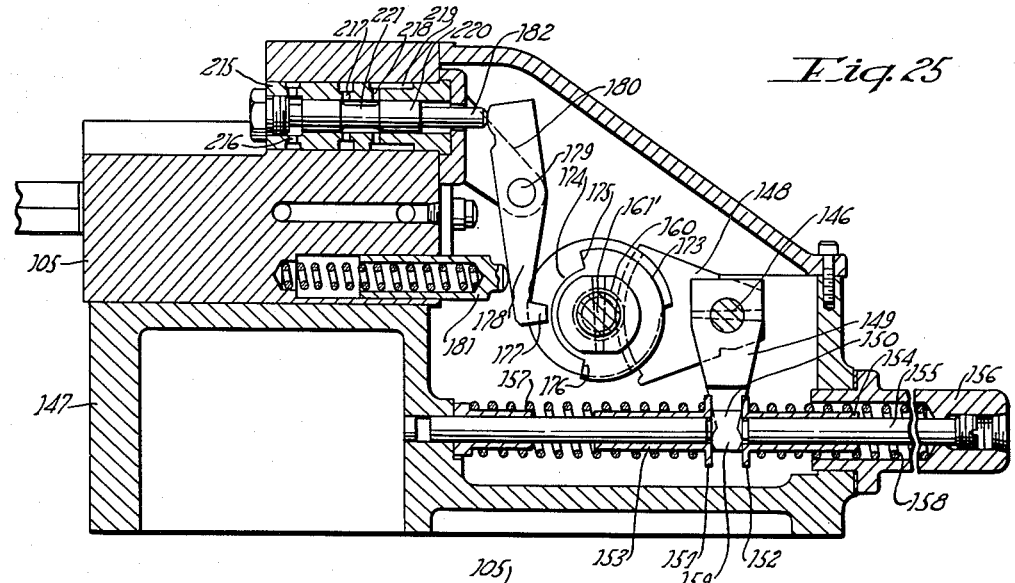
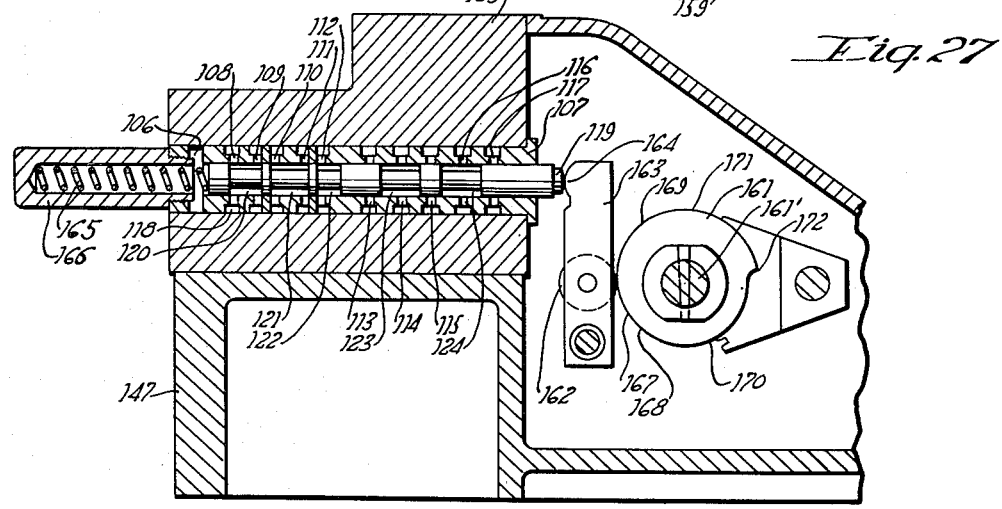
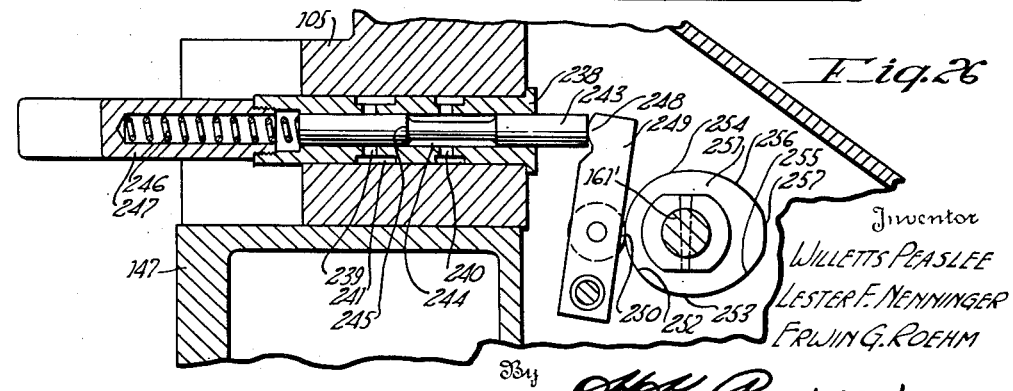

Dec. 22, 1936.   W. PEASLEE ET AL   2,065,151
GRINDING MACHINE
Filed Aug. 10, 1934   12 Sheets-Sheet 11

Inventor
WILLETTS PEASLEE
LESTER F. NENNINGER
ERWIN G. ROEHM
By AHK Parsons
Attorney

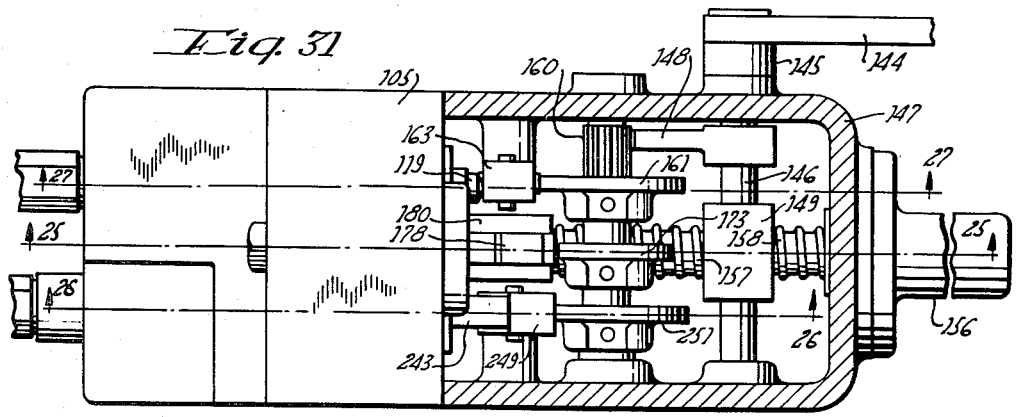
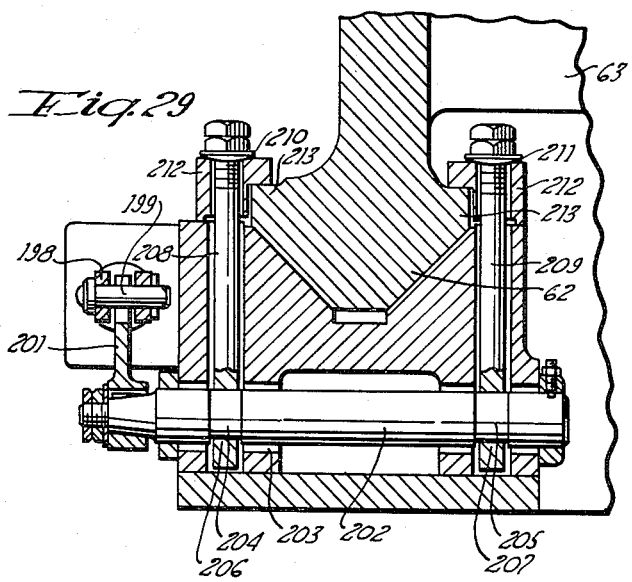
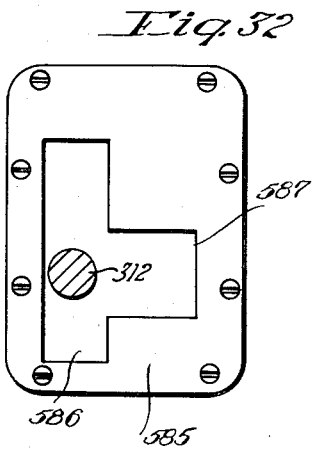

Patented Dec. 22, 1936

2,065,151

UNITED STATES PATENT OFFICE

2,065,151

GRINDING MACHINE

Willetts Peaslee and Lester F. Nenninger, Cincinnati, and Erwin G. Roehm, Norwood, Ohio, assignors to Cincinnati Grinders Incorporated, Cincinnati, Ohio, a corporation of Ohio Application August 10, 1934, Serial No. 739,224

21 Claims. (Cl. 51—49)

This invention relates to improvements in machine tools and particularly to improvements in grinding machines and the mechanism for controlling the movements and operations of the several units thereof.

The machine illustrated in the drawings is a grinding machine particularly adapted for the grinding or finishing of large diameter rolls such as employed in steel rolling mills. The particular machine illustrated was designed for operation on the largest types of said rolls which weigh many tons and must have their surfaces provided with a fine finish. Additionally, these rolls must be accurate within minute tolerances, both as to parallelism and concentricity. In order to produce such rolls the machine must be very massive and be accurately controlled and respond to minute adjustments. At the same time and in order to be commercially successful the said rolls must be produced in a minimum of time.

Accordingly, the principal object of the present invention is the provision of an improved precision grinding machine for producing rolls such as above described.

Another object of the invention is the provision of an improved control and operating mechanism for effecting and controlling the relative axial movement of the work and tool or grinding wheel.

Another object of the invention is the provision of improved actuating and control means for a tool or work slide for effecting the movement of one of said parts relative to the other, that may be preset for manual or automatic control whereby said controls, while being substantially separate and complete within themselves yet have a number of parts or units common to one another, thereby materially reducing the number of elements or units necessary while producing independent actuating and control mechanisms.

A further object of the invention is the provision of actuating and control mechanism as specified in the preceding paragraph and utilizing hydraulic pressure as the actuating medium.

A further object of the invention is the provision of improved means for effecting the relative feed between a tool and work piece, together with means for automatically securing the parts in clamped or locked position except when a feeding movement is to be effected or in progress.

A still further object of the invention is the provision of improved compensating means for finely adjusting the tool and work relative to one another in a feeding direction to take up wheel wear and other minute variations in the parts.

Other objects and advantages of the present invention should be readily apparent by reference to the following specification, considered in conjunction with the accompanying drawings forming a part thereof and it is to be understood that any modifications may be made in the exact structural details there shown and described, within the scope of the appended claims, without departing from or exceeding the spirit of the invention.

In the drawings:

Figure 1 is a front elevation of a grinding machine embodying improvements of this invention.

Figure 2 is a side elevation shown in Figure 1 as seen particularly from the right hand end thereof.

Figure 3 is a top plan view of the machine.

Figure 4 is a longitudinal sectional view as seen substantially from line 4—4 on Figure 3.

Figure 5 is a transverse sectional view through the rear portion of the machine as seen substantially from line 5—5 on Figure 3.

Figure 6 is a fragmentary sectional view through the wheel head as seen from line 6—6 on Figure 3, certain parts being omitted to more clearly show the construction.

Figure 7 is a fragmentary sectional view, similar to Figure 6, taken through a plane to the left of the plane of Figure 6 and illustrating the transverse adjusting mechanism.

Figure 8 is a view, partly in section and partly in elevation, as will be seen on line 8—8 on Figure 3.

Figure 9 is a fragmentary view as seen from line 9—9 on Figure 8.

Figure 10 is a sectional view through the cambering bar adjusting mechanism as seen from line 10—10 on Figure 8.

Figure 11 is a sectional view taken longitudinally of the spindle as on line 11—11 on Figure 3.

Figure 12 is a fragmentary horizontal sectional view of the wheel feed mechanism as seen on line 12—12 on Figure 5.

Figure 13 is a sectional view through the cambering bar adjusting mechanism as seen from line 13—13 on Figure 8.

Figure 14 is a fragmentary sectional view through the valve block as seen from line 14—14 on Figure 3.

Figure 15 is a transverse sectional view through the valve actuating mechanism and is in effect a continuation of section 14—14.

Figure 16 is a staggered sectional view looking in the direction of the arrows on line 16—16 on Figure 15 with the bearings of the shafts and rods shown in cross section.

Figure 17 is a horizontal fragmentary sectional view as seen from line 17—17 on Figure 16.

Figure 18 is a fragmentary elevational view of a portion of Figure 16 as seen from line 18—18 thereon.

Figure 19 is a transverse sectional view through the valve actuating mechanism as seen from line 19—19 on Figure 14.

Figure 20 is a sectional view taken on line 20—20 on Figure 6.

Figure 21 is a fragmentary sectional view taken on line 21—21 on Figure 16.

Figure 22 is a sectional view taken on line 22—22 of Figure 19.

Figure 23 is a staggered sectional view taken on line 23—23 on Figure 19.

Figure 24 is a fragmentary sectional view through the valve block as seen from line 24—24 on Figure 19.

Figure 25 is a sectional view through the control valve housing for the transverse or cross feed slide as seen from line 25—25 on Figure 31.

Figure 26 is a view similar to Figure 25, but taken through a plane spaced from that of Figure 25 as on line 25—25 on Figure 31.

Figure 27 is a view similar to that of Figures 25 and 26 but taken through a plane spaced from that of Figure 26 as on line 26—26 on Figure 31.

Figure 29 is a sectional view through the slide locking mechanism as seen from line 29—29 on Figure 5.

Figure 30 is a sectional view through one of the valves as seen from line 30—30 on Figure 24.

Figure 31 is a plan view of the control mechanism for the transversely shiftable slide.

Figure 32 is a plan view of a portion of Figure 16 as seen from line 32—32 thereon.

Throughout the several views of the drawings similar reference characters are employed to denote the same or similar parts.

Figure 28:
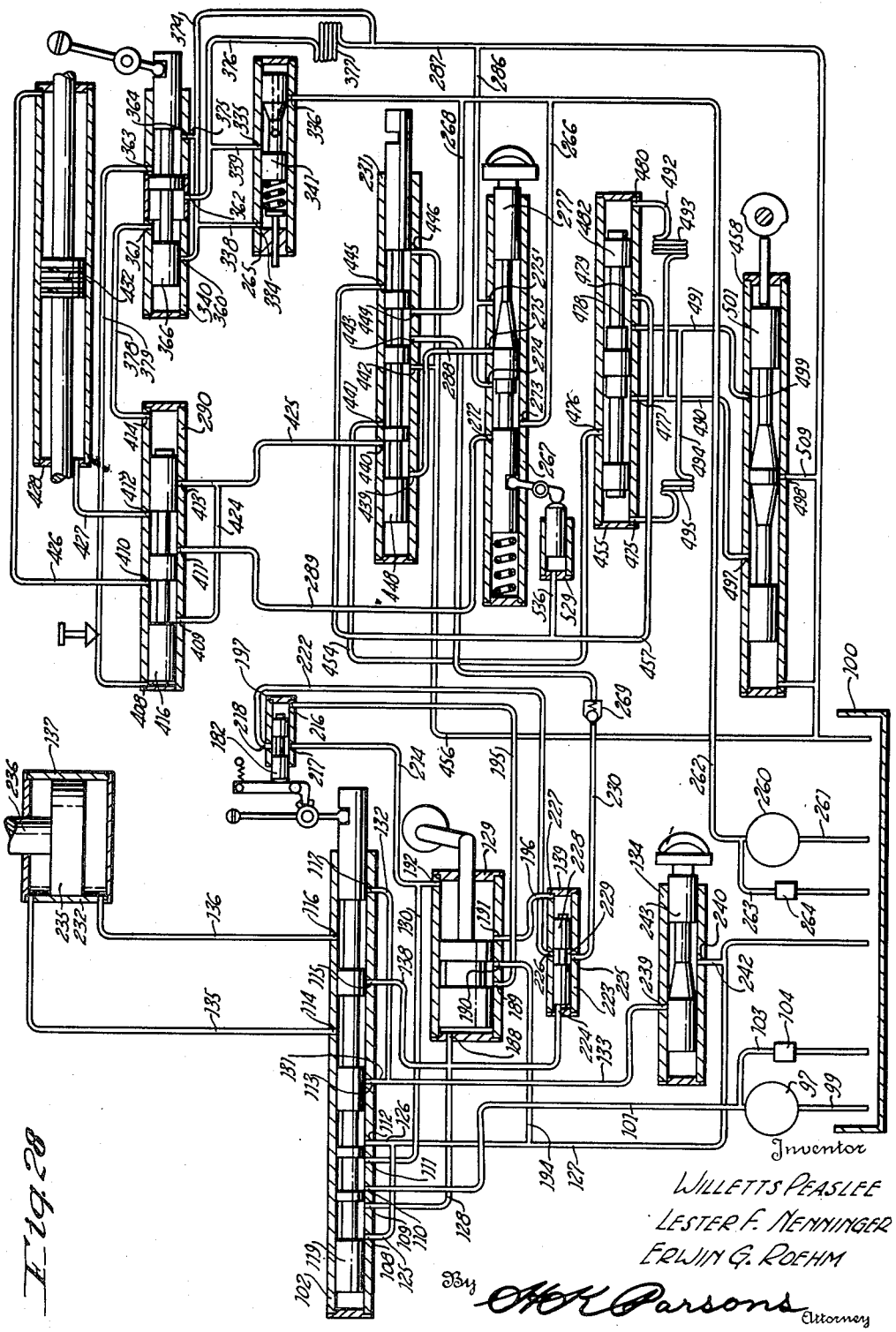
Figure 28 is a diagrammatic view of the hydraulic circuit involved in the invention.

A machine of the present invention comprises two independent assemblies, one for supporting and driving the work while the other supports the tool or grinding wheel. Each assembly includes a main supporting bed 30 and 31 respectively mounted on a separate cementitious support 32 and 33. As seen in Figure 2 the supports are of different elevation, the surface of the support 33 being considerably below the surface of the support 32 and additionally being in the form of an island entirely surrounded by a trough 34 which constitutes the coolant tank. Each of the beds 30 and 31 is mounted on a plurality of leveling blocks or jacks 35 spaced at intervals along each side of the said beds. Extending through each of said leveling jacks is an anchor or fastening bolt 36 having its lower end rooted in the cementitious supports 32 and 33.

The work supporting bed 30 is of a relatively shallow depth and of fabricated or welded construction to which is bolted the flat and inverted V guide ways 37 and 38 supporting for adjustment relative thereto a tailstock 39 and journal rests 40 and 41. The journal rests 40 and 41 are adapted to support the journals 42 of the work piece 43 here shown as a roll of the type used in steel and paper mills. Beyond the guide ways 37 and 38 the bed 30 has secured thereto a headstock 44 from which projects a center 45 and a driving face plate 46. The face plate 46 is rotatably driven from a motor 47 mounted extraneously of the machine on the cementitious support 32 through a suitable transmission contained in the headstock 44. The headstock center 45 is in axial alignment with a center 48 projecting from a spindle 49 associated with the tailstock 39 and the said centers 45 and 48 constitute terminal abutments for the work or roll 43. The tailstock 39 is adapted to be translated on the ways 37 and 38 by a self-supported motor 50 connected through a suitable transmission carried by the headstock to a driving pinion (not shown) connected with a rack 51 carried by the guide way 38. Additionally, the spindle 49 is axially adjustable relative to the tailstock housing 39 by means of a hand wheel 52 mounted on the tailstock 39.

The bed 31 of the tool supporting assembly, similar to the bed 30, is of relatively shallow construction so far as height is concerned and is likewise formed of fabricated or welded construction. Bolted or otherwise secured to the bed 31 are the flat and V ways 53 and 54, see Figure 5, receiving respectively the guides 55 and 56 depending from the translatable slide 57. The slide 57 is of fabricated or welded construction as shown in Figure 5 and supports the grinding wheel, the means for rotating the grinding wheel, all of the means for controlling its translation and the means for effecting and controlling the transverse adjustment of the grinding wheel as will later be made clear, and in addition provides the operator's station which travels therewith during the grinding or tooling operation. Mounted on the translatable slide 57 is a base plate 58 on which is formed the flat and V guide ways 59 and 60. Cooperating with said guide ways are the guides 61 and 62 depending from the transversely adjustable slide 63. The transverse slide 63 has provided at its forward end trunnion bearings 64 in which is journaled a trunnion shaft 65 for a tool carriage 66. The tool carriage 66 is adapted to be manually and automatically oscillated about the axis of the trunnion shaft 65 by means to be described later.

The carriage 66, see Figure 11, provides bearings 67 and 68 in which is rotatably journaled a spindle 69. The spindle 69 is provided on its forward end with a tapered nose 70 to which is keyed and clamped a wheel collet 71 to which is in turn secured a grinding wheel 72. The wheel 72 is substantially enclosed by a guard 73 carried by the carriage 66 and is employed to confine the coolant used on the wheel and work. The other or rear end of the spindle 69 is also provided with a tapered nose 74 to which is keyed and clamped a pulley or sheave 75 here shown as of the multiple groove type. The pulley or sheave 75 has trained thereabout a plurality of V belts 76, in turn, see Figure 2, being trained about a driving sheave 77 on the shaft of driving motor 78. The motor 78 is secured to the carriage 66 and partakes of all movements imparted thereto.

The grinding wheel spindle 69 is adapted to be axially shifted relative to the bearings 67 and 68. For this reason it is provided substantially centrally of its length with an enlarged flange portion 79 on either side of which, encircling the spindle, are the collars 79a and 81 forming therebetween a circumferential groove 80 receiving the spindle flange 79. The collar 81 has projecting therefrom at diametrically opposite points bosses 82 and 83 and the said collar is surrounded by a second ring 84 through which passes pivot screws 85 and 86 entering the collar or ring 81 through the bosses 82 and 83. The ring 84 is likewise provided with diametrical bosses 87 and 88 which are disposed at right angles to the bosses 82 and 83. Disposed partially around the ring 84 is a yoke member 89 carrying pivot bolts 90 which enter into the second ring bosses 87 and 88. The yoke 89 is keyed or otherwise secured to the lower end of a vertically disposed shaft 91 rotatably journaled in a bearing provided by the carriage 66 and a second bearing provided by a housing 92 secured to the carriage 66 above the spindle. The upper end of the shaft 91 projects into the interior of the housing 92 and has keyed thereto a segmental worm wheel 93. Meshing with the teeth of the segmental worm wheel 93 is a worm 94 integral with or secured to a worm shaft 95, see Figure 11. The shaft 95 is rotatably journaled in bearings supplied by the housing 92 and projects beyond the housing to receive a hand wheel 96. It should be noted at this time, and as will be seen from Figure 11, that the hand wheel is disposed on the same side of the grinding wheel carriage as the grinding wheel itself, which is adjacent to an operator's station on the translating slide 57.

The operation of the spindle reciprocating mechanism is believed obvious since a rotation of the hand wheel 96 in one or the other direction will correspondingly oscillate the worm segment 93 and thereby the yoke 89. This will tend to shift the rings 81 and 84 axially of the spindle but since there is no lost motion on either side of the spindle flange 79 and the collars or inner ring 79a and 81 the spindle itself will be moved thereby. It should be noted, however, that in machining the collars or in mounting same on the spindle the abutment faces presented thereby to the said inner or first ring may not be truly at right angles to the opposed faces of the first or inner ring 81 and since it is held by the yoke and associated mechanisms the spindle may have a tendency to vibrate slightly when the high portions engage one another which is overcome by the double pivoting of the inner and outer rings, permitting them to oscillate about their pivotal mountings while maintaining the spindle in a definite axial position. It is to be understood that this out of squareness of the parts above mentioned is very minute and even if not compensated for would be invisible to the eye but sufficient to possibly interfere with the production of precision work pieces.

As was suggested above, the transverse slide 63 is movable laterally of the rear bed 31 or laterally of the translatable base plate or slide 58. The means for effecting this movement, as shown in the present application, is of the pressure fluid or hydraulic type and it will be noted that this transverse slide is normally clamped or locked against movement except when the slide is being actuated, the clamping of the slide being also effected by hydraulic means and so interconnected with the traversing means as to be automatically operated both for unclamping the slide prior to movement thereof and then clamping the slide upon cessation of said movement.

The hydraulic mechanism for effecting and controlling the movement of the transverse slide is shown diagrammatically in the left hand portion of Figure 28 and structurally in several other figures and this mechanism will be described as seen in said Figure 28, the different units being structurally described as they are encountered in the diagram. Accordingly, this mechanism comprises a pump 97 driven by a motor 98 located on the translatable slide 57. The pump 97 has extending from one side thereof a suction pipe 99 terminating in a tank 100 which contains a hydraulic actuating medium, preferably oil. It should be noted that the interior of the fabricated translatable slide 57 is utilized as the tank 100. Extending from the other side of the pump 97 is the main pressure pipe or conduit 101 which terminates in the control valve indicated generally in Figure 28 by the reference character 102. Extending from the pipe or conduit 101 is a branch, discharge, conduit 103 containing a relief valve 104 which determines the actuating pressure in the pipe 101 and therefore the hydraulic system.

The control valve unit 102 is shown diagrammatically in Figure 28 and structurally in Figure 27 and comprises a valve casing or block 105 mounted on the translatable slide 57. The block 105 is provided therein with a bore 106 into which is pressed a bushing 107 having formed therethrough a plurality of ports 108, 109, 110, 111, 112, 113, 114, 115, 116 and 117, each set of ports being encircled by a similar circumferential groove 118 formed in the exterior of the valve bushing 107. Disposed within the bore in the valve bushing for axial movement relative thereto is a valve member 119 having formed thereon a plurality of piston portions forming between them cannelures 120, 121, 122, 123 and 124 which connect the several sets of radial ports in different combinations depending upon the position of the valve member 119 relative thereto.

It is with the ports 110 of the valve bushing 107 that the other end of the pipe 101 connects, while the ports 108 and 112 have respectively connected therewith branch discharge pipes or conduits 125 and 126 which empty into main discharge pipe or conduit 127 that terminates in the sump or tank 100. The ports 109 have connected therewith one end of a pipe or conduit 128 terminating at its other end at one end of the slide clamping cylinder, indicated generally in Figure 28 by the reference character 129, while the other end of this cylinder is connected by a pipe or conduit 130 with the bushing ports 111. The ports 113 and 117 are respectively connected through branch pipes or conduits 131 and 132 with a pipe or conduit 133 which terminates at the stop-throttle or rate control valve mechanism indicated generally in Figure 28 by the reference character 134. The ports 114 and 116 have respectively connected therewith one end of pipes or conduits 135 and 136 respectively terminating at their other ends at opposite ends of the transverse slide actuating piston and cylinder mechanism indicated generally in Figure 28 by the reference character 137. The remaining ports 115 of the bushing 107 are connected to one end of a pipe or conduit 138 which is connected, intermediate its ends, with the pipe or conduit 128 extending from the clamping cylinder 129 and the pipe 138 terminates at one end of a shuttle valve mechanism indicated generally in Figure 28 by the reference numeral 139.

The valve member 119 has three positions; the neutral or clamping position shown in Figures 27 and 28 and one position on either side thereof. The mechanism for effecting the operation of the valve is shown in Figures 5, 25, 27 and 31 and comprises the lever 140 shown in Figure 5 and keyed or otherwise secured to a short shaft or stud 141 oscillatably mounted in a bracket 142 carried by the translatable slide 57. On the other side of the bracket 142 the shaft 141 has keyed or otherwise secured thereto an arm 143 having pivotally connected to its upper or free end the forward end of a link 144. The rear end of the link 144 is pivotally connected to the lower end of a lever 145 fastened to the end of a shaft 146. The shaft 146 is journaled in the walls of a bracket or housing 147 to which is secured the valve block 105 and which housing contains the actuating mechanism for the several valves utilized in controlling the transverse movement of the transverse slide.

As seen in Figures 25, 27 and 31 the shaft 146 interiorly of the housing 147 has keyed or otherwise secured thereto a segmental gear 148 and an arm 149. The arm 149 has its bifurcated ball end 150 disposed between flanges 151 and 152 of sleeves 153 and 154. Extending through the bores in the sleeves 153 and 154 is a shaft 155 having one end carried by the housing 147 and the other end carried by a counterbored sleeve 156 secured to the forward face of the housing 147. Encircling the shaft 155 on each side of the arm 149 is a spring 157 and 158 respectively abutting on their inner ends the flanges 151 and 152 of the sleeves 153 and 154 and on their outer ends with the housing 147 and the base of the counterbore in the sleeve 156. The springs 157 and 158 exert their yielding force toward one another for normally holding the arm in the central position shown in Figure 25, the movement of the arm 149 as effected by the springs being limited by an enlarged portion 159 on the shaft 155 which is the portion normally straddled by the bifurcated end 150 of the arm. From the foregoing it will be seen that the lever 140 may be actuated in either direction relative to the axis of the shaft 141, thereby effecting reverse oscillations of the arm 149 and a compression of one or the other of the springs 157 and 158. At the same time release of the lever 140 will permit the compressed spring to expand and return the parts to their normal position.

The segmental gear 148 has its teeth in mesh with a gear or pinion 160 fast on a shaft 161', which, similar to the shaft 146, is rotatably journaled in the walls of the housing 147 or suitable bearings provided thereby. In addition, the shaft 161' has pinned or otherwise secured thereto a cam member 161, on the periphery of which rides a roller 162 rotatably carried by an arm 163. The arm 163 is oscillatable journaled on a pin supported by the housing 147 and has its free or ball end 164 contacting with the valve member 119. In order to maintain engagement between the valve member 119 and the ball end 164 of lever 163, as well as contact between the roller 162 and periphery of cam 161, the said valve member 119 is yieldably actuated toward the right as seen in Figure 27 by means of a spring 165 abutting on the end of the valve member 119 and the base of the guard sleeve 166.

From the foregoing it will be appreciated that depending upon which point of the periphery of the cam 161 is in engagement with the roller 162 will depend the position of the valve member 119. As shown in Figure 27, the parts are so related as to hold the valve 119 in its normal clamping position, thereby imparting no movement to the transverse slide.

Rotation or oscillation of the cam 161 however, either in a clockwise or counterclockwise direction, from the position shown in Figure 27 effects the movement of the valve member to its operative unclamping position and slide moving positions. Accordingly, the cam 161 has a rising portion 167 extending substantially from point 168 to point 169 and concentric portions 170 and 171 extending respectively from the points 168 and 169 to the point 172.

The relationship of the parts between the operating lever or handle 140 and the valve member 119 is such that the upper slide is moved in the direction of movement of the lever, that is, movement of the lever 140 in a clockwise direction or to the right as seen in Figure 5 effects the corresponding movement of the upper slide and therefore the grinding wheel, while reverse movement of the lever 140 reversely moves the said upper slide and grinding wheel. It should be noted, however, that the initial movement of the lever 140 and therefore the cam 161 is limited so that the said cam may be moved from the position shown in Figure 27 in either direction only to the position where the high or the low point 168 or 169 is in contact with the roller 162. In other words, the initial movement of the handle 140 is limited to the shifting of the valve member 119 from the position shown in the drawings to either of its extreme operative positions. The handle is there held until the slide is unclamped whereupon the handle may be moved to effect actuation of the slide but the valve 119 is not further moved because the concentric portions 170 and 171 of the cam are at this time riding on the roller 162 without effecting any further oscillation of the lever 163.

The means for limiting this initial movement of the handle 140 comprises a mutilated disc 173 having cutaway or relieved portion 174 supplying shoulders 175 and 176 which are adapted to engage with the nose 177 of a latch member 178. The latch member 178 is pivoted intermediate its ends at 179 to an arm 180 integral with and projecting from the valve block 105. As seen in Figure 25, the latch 178 is engaged on one side of the pivot 179 by a spring pressed plunger 181 and on the other side by a piston valve member 182. As shown in the drawings there is no pressure behind the piston valve 182, wherefore the plunger 181 is holding the latch 178 in interfering position in order to engage either of the shoulders 175 and 176 depending upon in which direction the shaft 161' is rotated.

Continuing now with the circuit as shown in Figure 28 and with a detailed description of the different units as encountered therein it will be noted that cannelure 121 of the valve member 119 is connecting pressure conduit 101 with the conduit 130 and therefore the right hand end of the piston and cylinder mechanism 129. This piston and cylinder mechanism is shown structurally in Figure 5 and comprises a cylinder 183 which also acts as a valve bushing. Disposed within the bore in the cylinder 183 is a piston 184 having extending therefrom a piston rod 185. The rod 185 is slidably mounted in a head 186 at one end of the cylinder 183. The other end of the cylinder 183 is closed by a second head 187 through which is formed a port 188. Additionally, the cylinder 183 is provided with ports 189, 190, 191 and 192 adapted to be connected with one another in different combinations depending upon the position of the piston relative to the cylinder and by the cannelure 193 formed in the piston 184.

It is with the ports 192 that the conduit 130 connects while the port 188 has connected therewith the conduit 128. The port 190 is connected by a conduit 194 with the main discharge conduit 127 while the ports 189 and 191 have respectively connected therewith one end of conduits 195 and 196 respectively terminating in the latch releasing mechanism indicated generally by the numeral 197 and the shuttle valve mechanism 139.

As will be appreciated and later made clear, the piston 184 is shifted to the opposite ends of the cylinder 183 by hydraulic pressure, entering the said cylinder by way of conduits 128 and 130. The position of the piston shown in Figure 28 is the transverse slide clamping or locking position and the means for effecting the said clamping or locking of the slide is shown structurally in Figures 5 and 29. This means comprises a cross head 198 secured to the piston rod 185. Projecting from the cross head is a pin 199 received in the forked end 200 of an arm 201. The arm 201 is keyed or otherwise secured to a shaft 202 oscillatably journaled in bearings 203 provided by the base plate 58. Adjacent each end of the shaft 202 it is provided with eccentrics 204 and 205 respectively disposed in the eyes 206 and 207 of draw or clamping bolts 208 and 209. Secured to the upper ends of each clamping bolt 208 and 209 is an elongated clamping shoe 210 and 211, each including a clamping lug 212 respectively cooperating with a flange 213 projecting laterally from either side of the V way 62 of the transverse or upper slide 63.

The clamping and release of the slide will therefore be effected by reverse oscillations of the shaft 202 which in turn is effected by reverse reciprocations of the piston 184.

With the parts in the position shown in Figure 28 the flow of the hydraulic medium continuous from the piston and cylinder mechanism through a pipe or conduit 214 which is connected at one end with the pipe or conduit 130 and port 192 of the cylinder 183 and at its other end is the latch releasing mechanism 197. The latch releasing mechanism 197 is shown structurally in Figure 25 and comprises a valve bushing 215 pressed into a suitable bore formed in the valve block 105. The bushing 215 has formed therethrough a plurality of sets of radial ports 216, 217 and 218, each set of ports being connected by a groove 219 formed circumferentially of the bushing 215. Disposed within the bore in the bushing 215 is the plunger 182 which has integral therewith the valve portion 220, also constituting the piston which effects the movement of the plunger 182 for disposing the latch 178 to its inoperative position. The piston or valve portion 220 is provided with a cannelure 221 for connecting the ports 217 and 218 when in the position shown in the drawings.

The ports 216 and 217 of the valve bushing 215 have respectively connected therewith the other termini of pipes or conduits 195 and 214 extending from the piston and cylinder mechanism 129. The remaining ports 218 of the bushing 215 have connected therewith one end of pipe or conduit 222 terminating at its other end in the shuttle valve mechanism 139.

The flow of the hydraulic medium, as seen in Figure 28, is from the conduit 214 through the latch releasing piston-valve mechanism 197 to the conduit 222 and the shuttle valve mechanism 139; clearly shown in Figure 28.

The shuttle valve mechanism 139 comprises a valve bushing 223 having formed therein ports 224, 225, 226 and 227. Disposed in the bore in the bushing 223 is a shuttle valve member 228 having formed therein a cannelure 229 for connecting, when in the position shown in Figure 28, the ports 225 and 226. It is with the ports 224 disposed at one end of the bushing and therefore on one side of the valve member 228 that the conduit 138 connects, while the ports 227 disposed at the other end of the bushing 223 and therefore on the other side of the valve member 228 has connected therewith one end of the conduit 196 which has its other end connected with the slide clamping piston and cylinder mechanism 129. Connected with the ports 225 is one end of a pipe or conduit 230 terminating at the other end in a selector valve mechanism 231 of the means for controlling the operation of the translatable slide which in turn connects with the sump by means later to be made clear. Additionally, the selector valve mechanism 231 provides a back pressure in the conduit 230 which will also be described in detail later. Connected with the remaining ports 226 of the bushing 223 is the pipe or conduit 222 extending from the latch releasing piston mechanism 197.

From the foregoing it will now be seen that with the upper or transversely movable slide, which carries the grinding wheel, in a normally locked position the pump 97 is short circuited on itself to the sump or tank 100, while at the same time a back pressure is maintained on the fluid in the system. This back pressure acting on the clamping piston 184 maintains same in the position shown in the drawings. Assuming now it is desired to shift the grinding wheel and therefore the slide 63 toward the work or to the right as seen in Figure 5 the lever or handle 140 is shifted in this direction. This actuation of the handle 140 is therefore clockwise as seen in Figure 5 which will effect a similar movement of the cam 161, thereby permitting the roller 162 to ride on the portion of cam rise 167 down to the low point 168. This permits the spring 165 to shift the valve member 119 to the right as seen in the drawings and the movement of this cam continues until the shoulder 176 of the disc 173 engages the nose 177 of the latch 178. The valve member 119 at this time takes the position with the cannelure 120 connecting the pressure conduit 101 with the conduit 128. The pressure then in conduit 128 simultaneously passes into the cylinder 183 and through conduit 138 to the shuttle valve mechanism 139 and main valve mechanism 102 where it is connected through the cannelure 123 with the pipe or conduit 135. At this particular instant, however, the clamping piston 184 is not moved, nor is the piston and cylinder mechanism 137 actuated but instead the shuttle valve member 228 is shifted to its second operative position, that to the right of the position shown in Figure 28. This movement of the shuttle valve member 228 disconnects the conduits 222 and 230, so that irrespective of whether the line 130 and associate conduits are connected with pressure as when the valve 119 is in the position shown in Figure 28 or with exhaust when the valve is laterally displaced, there can be no escape of the actuating medium through check valve 269 to the right hand portion of the system until such time as adequate pressure has been built up in line 130 to shift the clamp into its left hand locking position uncovering port 191 so that the shuttle valve is positively reversely shifted.

With the full pressure now in conduits 138 and 128 acting on the piston 184 it is shifted to its releasing position to the right of that shown in the drawings. At this time the conduits 195, from the latch releasing mechanism 197, and the discharge conduit 194 are disconnected and instead the piston 184 connects the ports 188 and 189, as shown in Figure 5, thereby connecting the pressure in the conduit 138 with the conduit 195 and effecting a movement of the piston valve member 220 to the left as seen in Figure 28 or to the right as seen in Figure 25, thereby removing the latch nose 177 from the path of the disc shoulder 176.

As was mentioned above, the movement of the valve member 119 to its operative position connects the pressure with the conduit 135 for effecting the movement of the slide toward the work. The piston and cylinder mechanism is shown structurally in Figure 7 and comprises a cylinder 232, closed at one end by a head 233 and at the other end by a head 234. Disposed within the cylinder 232 is a piston 235 having extending therefrom a piston rod 236. The rod 236 is mounted for sliding movement through a suitable stuffing box in the head 233 and has its projecting end connected to a tongue 237 depending from the slide 63. The movement of the piston 235 is to the left as seen in Figure 7 or downwardly as seen in Figure 28 to shift the grinding wheel toward the work, that is, toward the right as seen in Figure 5. With this movement the hydraulic medium head of the piston is forced from the cylinder into and through the pipe or conduit 136 to the valve mechanism 102. At this time the conduit 136 is connected with the pipes or conduits 132 and 133 through the valve cannelure 124 to the throttle valve mechanism 134. It will be seen from Figure 28 that any flow through the exhaust pipes is blocked by the said throttle valve 134; therefore, even though there is pressure now acting on the piston 235, it is not now movable.

The throttle valve mechanism is shown structurally in Figure 26 and comprises a valve bushing 238 pressed into a suitable bore formed in the valve block 105. The bushing 238 has formed therein a pair of sets of radial ports 239 and 240, each set being encircled by a similar circumferential groove 241 formed in the exterior of the bushing 238. It is with the ports 239 that the pipe or conduit 133 connects while the ports 240 have connected therewith a branch discharge pipe or conduit 242 emptying into the main discharge conduit 127 and therefore the sump or tank 100.

Disposed within the bore in the bushing 238 is a valve member 243 having formed therein a reduced portion or cannelure 244 forming at one end a shoulder 245. The shoulder 245 is adapted to be shifted relative to the ports 239 to more or less open said ports and permit a flow therethrough, which is regulated to determine the speed at which the piston and cylinder mechanism is to be actuated and therefore the speed at which the grinding wheel is to be moved.

The valve member 243 is normally shifted to the right by means of a spring 246 disposed within a socket in the spring guard sleeve 247, the spring abuts at one end the base of the socket and at the other end the adjacent terminus of the valve member 243. The spring 246 holds the said valve member 243 against the free or ball end 248 of a lever 249 pivoted at its lower end to the housing 147. In between the ends of the lever 249 it carries a roller 250 riding on the periphery of a cam 251, pinned or otherwise secured to the cam shaft 161'.

The cam 251 is simultaneously rotated with the cam 161 and mutilated disc 173 but only comes into play after the slide has been released or unclamped. For this reason the cam 251 is provided with a concentric portion 252 extending substantially from a point 253 to a point 254. Extending respectively from the points 253 and 254 the cam 251 is provided with rising portions 255 and 256 which extend to the point 257. The concentric portion 252 has an extent substantially equal to the rising cam portion 167 of the cam 161 and lies within the zone of movement of the shaft 161' as permitted by the shoulders 175 and 176 of the mutilated disc 173. From the foregoing it will therefore be appreciated that the initial movement of the handle 140 shifts the main valve member 119 to either of its operative positions which effects the operation of the slide clamping and releasing piston and cylinder mechanism 129, upon release of which the latch is rendered inoperative and the handle 140 permitted to be further actuated; the further actuation of the said handle permitting the movement of the slide and at a rate determined by the amount of movement of the said handle.

The complete operation of the upper or transversely movable slide is as follows:

Handle 140 is oscillated in one or the other direction about the pivot shaft 141 for correspondingly rotating the cam shaft 161' and compressing one or the other of the springs 157 or 158. The said handle is moved to the limit of its movement as determined by the shoulders 175 and 176 of the disc 173 contacting with the latch nose 177. This movement of the handle and therefore the rotation of the cam shaft 161' through the cam 161 shifts the main valve member 119 to one or the other of its operative positions.

At this time the pressure in the conduit 101 is connected with the conduits 128 and 138 for first shifting the shuttle valve member 228 and then the piston member 184 to release or unclamp the slide 58. Simultaneously with the connection of the pressure in the conduits 128 and 138 the pressure in 138 is connected with either of the conduits 135 and 136, connecting the remaining conduit with the discharge conduit 133 and throttle valve mechanism 134. As soon as the slide is released or unclamped the pressure is connected with the latch releasing mechanism, whereupon the handle 140 may be further actuated in the direction in which it was initially moved.

This further movement of the handle 140 further rotates the cam shaft 161' but since now the concentric portions 170 and 171 of the cam 161 are in engagement with the roller 162 no further movement of the main valve member 119 takes place, it being merely held in its operative position. At this time, however, the rising portions 255 and 256 of the cam 251 are engaging the roller 250 which oscillate the lever 249 and shift the valve member 243 and the shoulder 245 thereon relative to the ports 239. The uncovering of the ports 239 permit the escape of the fluid through the conduit 133 whereupon the pressure in one of the conduits 135 and 136 effects movement of the slide 63.

During this further movement of the handle 140 one of the springs 157 and 158 is being further compressed or loaded and as soon as there is no pressure on the handle 140 the said spring expands to return the lever to its initial position, thereby stopping further movement of the parts.

The grinding wheel is adapted to be shifted or translated longitudinally of the rear bed 31 along with the translatable slide 57 by suitable means, preferably hydraulic means as shown in the drawings. This hydraulic mechanism is shown diagrammatically in Figure 28 and structurally in certain of the other views. The hydraulic circuit and the control valves and actuating means therefor will be described in detail, as they each appear in Figure 28. Accordingly, there is provided a pump 260 shown in Figure 3 as coupled with the motor 98 for simultaneous actuation with the pump 97. The pump 260 has extending therefrom a suction pipe 261 which projects into the sump or tank 100. Extending from the other side of the pump 260 is a pressure conduit 262 from which pipe, or conduit 263, extends, containing the pressure establishing or relief valve 264. The pressure pipe or conduit 262 terminates at its other end in a pressure reducing valve mechanism indicated generally in Figure 28 by the reference numeral 265. A branch conduit 266 extends from the pressure conduit 262 and terminates in a combination stop and manually actuated throttle valve mechanism indicated generally in Figure 28 by the numeral 267. Additionally, the pressure conduit 262 has a branch pipe or conduit 268 extending therefrom which terminates in the selector valve mechanism 231. As shown in Figure 28, the selector valve mechanism is connecting the pipe or conduit 230 with 268 and therefore the pressure conduit 262 and branch pressure conduit 266. It should be noted at this time that the conduit 230 has therein a one way check valve 269 permitting the flow of the hydraulic medium as effected by the pump 97 through the pipe or conduit 230 and into the conduit 268 while preventing a reverse flow of the medium as would be effected by the pump 260. Since, however, and as will now be explained the resistance to flow through the pipes or conduits 262 and 266 is much less than the pressure of the pump 97 in the conduit 230 there is no tendency of the flow through pipe or conduit 268 into the pipe or conduit 230. The valve mechanism 267 by-passes both pumps 97 and 260 to the sump or tank 100 but creates a slight back pressure in the system.

The stop and manually actuable throttle valve mechanism 267 is shown structurally in Figure 24. As there shown, this valve mechanism comprises a valve block 270 into which is pressed a valve bushing 271 having formed therethrough a plurality of sets of radial ports 272, 273, 274, 275 and 275', each set of ports being encircled by a similar circumferential groove 276 formed in the exterior of the bushing 271. Disposed within the bore in the bushing 271 is the valve member 277 having formed thereon piston portions 278, 279 and 280. Between the piston portions 278 and 279 the valve member is provided with a reduced portion 281 forming a cannelure, and additionally projecting from the piston portion 279 into the cannelure is a collar 282 slightly less in diameter than the piston portion 279 and adapted to form a restricted orifice 283 between itself and the ports 274. Between the piston portions 279 and 280 the valve member 277 is provided with a reduced portion 284, which however is only slightly less in diameter than the piston portions and forming thereby a restricted orifice 285. It should be noted that the ports 275 are relatively narrow slots which cooperate with the restricted orifice or passage 285 in controlling the rate of flow of the medium therethrough and determine the rate of movement of the slide as will later be made clear.

As seen in Figure 28 the ports 273 have connected therewith the branch pressure conduit 266, while the ports 274 and 275' are connected with the pipe or conduit 286 emptying into the main return conduit 287, in turn emptying into the tank or sump 100. The ports 275 have connected therewith one end of a pipe or conduit 288 which terminates at its other end in the selector valve mechanism 231 while the remaining ports 272 are connected with one end of a pipe or conduit 289 terminating in the reversing valve mechanism indicated generally in Figure 28 by the reference numeral 290. With the valve member 277 in the position shown the flow from the pumps 97 and 260 is respectively through the mechanism for the transversely shiftable slide to the pipe 230, selector valve mechanism 231 and pipes or conduits 268 and 262 to the pipe or conduit 266, while the flow from the pump 260 is through the pipe or conduit 262 to the pipe or conduit 266. The flow from the pipe or conduit 266 is through the ports 273, cannelure 281, restricted orifice 283, ports 274 and pipes or conduits 286 and 287 to the sump 100, the restricted orifice 283 slowing down the flow to an extent to establish the back pressure in the systems.

The stop and throttle valve mechanism 267 has two functions, one for effecting the complete stopping of the flow in the translating system and the second function for controlling the rate of translation when the translatable slide is manually actuated. For this purpose the said valve mechanism is shifted to the left, as seen in the drawings, both manually and by power means. The manual means for effecting the movement of the valve will be disclosed now and the power means later. Accordingly, the valve member 277 has its outer end contacting with the ball end 291 of a lever 292 carried by a sleeve 293 loosely journaled on a shaft 294 carried by the walls of a casing 295 secured to one face of the valve block 270. Additionally, the sleeve 293 has depending therefrom a second arm 296 which has its ball end 297 contacting with one end of a rod 298 slidably mounted in a bearing 299 supplied by a second casing or housing 300 which contains the valve actuating mechanism. The inner end of the plunger 298, see Figure 21, contacts with the ball end 301 of a lever 302 oscillatably mounted on a stud 303 projecting from one wall of the control mechanism casing 300. The lever 302 rotatably carries intermediate its ends a roller 304 contacting on the periphery of a heart shaped cam 305. The roller 304 is held in contact with the cam 305 by means of a spring 306, see Figure 24, abutting on one end with the valve member 277 and on the other end with a plug 307 which closes the bore through the valve bushing 271.

The cam 305 is adapted to be actuated, that is, oscillated in opposite directions from the position shown in Figure 21 but in each instance the valve member 277 is correspondingly shifted, that is, to the left, as seen in the drawings. For this reason the cam is substantially heartshaped, that is, its periphery 308—309 correspondingly rises from the low point 310 to the high point 311. The initial movement of the cam 305 closes off the ports 274 and opens the ports 272 to direct the pressure to the reversing valve mechanism 290 and then opens the ports 275 to permit the movement of the translating slide at a speed determined by the opening or closing of the ports 275 by the piston portion 279, all as will be more clearly described later.

The means for rotating the cam 305 is shown in Figures 15, 16 and 21 and comprises a lever 312 pivotally mounted at 313, for oscillation in a plane from left to right as seen in Figure 16, on a carrier member 314. The carrier member 314 is oscillatably mounted on a rod 315 for oscillation in a plane at right angles to the plane of oscillation of the lever about the pivot 313. From this it will be seen that the lever is movable from the left to right in Figure 16 as well as toward and from the observer of this view. These paths of movement of the lever 312 are defined by a plate 585 secured to the housing 300 above the lever 312 and having formed thereon a T slot made up of branches 586 and 587 through which the said lever projects, see Figure 32. It is the movement of the lever through slot 586 which effects the oscillation of the cam 305 and for this purpose the carrier 314 has integral therewith a segmental gear 316 having its teeth meshing with a pinion 318 formed on a shaft 319. The shaft 319 is oscillatably mounted in a bearing 320 supplied by one wall of the casing 300 and a second bearing 321 provided by the upstanding lug 322. It is to the pinion shaft 319 that the cam 305 is secured, wherefore any motion imparted to said shaft correspondingly actuates the cam 305 and shifts the valve.

It should be noted at this time that the valve block 270 and its casing 295 and the adjacent valve actuating control mechanism casing 300 are carried by the upper surface of the translatable slide 57 within convenient reach of the operator. The actuating handle or lever 312 is so positioned with respect to the slide and the operator that its movement to rotate the cam 305 indicates the direction of movement in which the slide will be translated. It should also be noted that the rate of translation of the slide will depend upon how far in either direction the handle 312 is shifted since the amount of movement of the handle 312 will determine which point on the periphery 308—309 of the cam 305 is controlling the position of the valve member 277 and therefore how rapidly the hydraulic medium is permitted to escape from the ports 275.

The holder or carrier 314 has integral therewith a yoke 323, see Figure 16, which straddles a shaft 324. Surrounding the shaft and disposed on each side of the yoke and contacting therewith are washers 325 and 326, each forming the inner abutment for springs 327 and 328 which in turn respectively abut on their outer ends with collars 329 and 330. As will be seen from Figure 15 the collars 329 and 330 are respectively spaced from bearing lugs 331 and 332 in which respectively are slidably mounted studs projecting respectively from collars 329 and 330.

The purpose for this mechanism is to return the handle or lever 312 to a stopping position upon release thereof, and operates in the same manner as a similar mechanism described above in connection with the handle 140. It should be noted, however, that the lost motion or space between the collars 329 and 330 and the bearing lugs is to permit the shifting of the valve member 277 to an open or starting position, that is, with the ports 274 closed and the ports 272 open before the opening of the ports 275. This movement of the valve member 277 is utilized in connection with the automatic translation of the slide as will later be described.

The reducing valve 265 is shown structurally in Figure 22 and comprises a valve bushing 333 pressed into a bore in the valve block 270. The bushing 333 has formed therethrough a plurality of sets of radial ports 334, 335 and 336, each set being encircled by a similar circumferential groove 337. As seen in Figure 28 it is with the ports 336 that the pressure conduit 262 connects, while the ports 334 and 335 have respectively connected therewith one end of pipes or conduits 338 and 339 which terminate at their other ends in the pilot valve mechanism indicated generally by the numeral 340.

Disposed within the bore in the bushing 333 is the pressure reducing valve member 341 having at opposite ends piston portions 342 and 343 with a reduced portion 344 projecting from the piston portion 342 to which the piston portion 343 is connected by a conical portion 345. The conical portion 345 is adapted to open, more or less, the ports 336 and act with said ports to provide a restricted orifice, thereby reducing the medium flowing from conduit 262 into the conduit 339. The valve member 341 is provided axially thereof, through the piston portion 343, with a bore 346 which is intercepted by a transverse bore 347 formed in the reduced portion 344 of the valve member. At its outer end the axial bore 341 empties into a chamber 348 formed in the bushing 333 at this end of the valve, the said chamber 348 being completed or closed by a plug 349 screwed into the valve bushing.

The valve member 341 is adapted to be actuated toward the right, as seen in the drawings, for opening the ports 336 by yielding means. For this purpose the bushing 333 is provided with an enlarged counterbore 350 in which are disposed spring cups 351 and 352 respectively abutting the adjacent end of piston valve member 341 and a plug 353 which closes the outer end of the counterbore 350. A spring 354 is provided and has one end seated in the cup 351 and the other end seated in a cup 352, the spring being of the expanding type for shifting the valve member 341 as above indicated toward the right.

The pilot valve mechanism 340 is shown structurally in Figure 14 and comprises a valve bushing 355 pressed into a bore in the valve block 270, which bushing is in effect formed in three parts 356, 357 and 358, the outer portions 356 and 358 having relatively small bores therethrough, while the central portion 357 is provided with a relatively enlarged bore 359. It should be noted, however, that when the bushing portions are placed in the bore in the valve block 270 they are in absolute axial alignment. Considering the bushing as a whole it is provided therethrough with a plurality of radial ports 360, 361, 362, 363 and 364, each set of ports being encircled by a similar circumferential groove 365 formed in the exterior of the bushing.

Disposed within the aligned bores of the bushing sections is a valve member 366 having piston portions 367 and 368 thereon adapted respectively to be disposed in the bores in the bushing sections 356 and 358. Additionally, the valve member 366 is provided with an enlarged collar or piston portion 369 disposed within the enlarged bore in the central bushing section 357. It should be noted that the piston portions 367, 368 and 369 relatively closely hug the walls of the bore to prevent any leakage past them. Piston portions 367 and 369 are connected to one another by a reduced stem portion 370 of a diameter less than the diameter of the piston portion 367, but sufficiently spaced from the wall of the bushing bore to permit a complete opening of the ports 363 and 364 when lying thereunder. The piston portions 368 and 369 are also connected by a stem portion 371 of a diameter likewise less than the diameter of the piston portion 368 for fully opening the ports 360 and 361 when lying thereunder.

From the description thus far it will be noted that there are provided within the enlarged bore 359 of the bushing 357 chambers 372 and 373 lying respectively on the right and left hand sides of the enlarged piston portion 369 which, as will later be made clear, are utilized as pressure chambers for effecting the shifting of the pilot valve member 366 beyond center since pressure therein will be simultaneously acting on the face of the piston portion 369 and the opposed small collar portion provided on the piston portions 367 and 368 by the stems 370 and 371. As seen in Figure 28, the ports 360 have connected therewith the pipe or conduit 338 which additionally has extending therefrom the pipe or conduit 374 which terminates in the main return or discharge conduit 287 terminating in a sump or tank 100, while the ports 364 have connected therewith branch discharge conduit 375 which empties into the discharge conduit 374. It should also be noted at this time that the conduits 338, 374 and 287 also act as a drain line for any fluid which may leak past the reducing valve member into the spring chamber thereof. Connected with the ports 362 of the valve bushing 355 is the pipe or conduit 339 which has extending therefrom a pipe or conduit 376 including a choke coil or hydraulic resistance 377 terminating in the discharge conduit 287. The remaining ports 361 and 363 of the valve bushing 355 have respectively connecting therewith pipes or conduits 378 and 379, terminating at their other ends in the reversing valve mechanism 290.

As was mentioned above, the pilot valve member 366 is shifted beyond center and therefore to its operating position by the medium under pressure when in either chamber 372 or 373 and the valve may therefore be termed a self-energizing valve. The valve member 366, however, is shifted slightly beyond the central position either by manual means or power means, depending upon whether or not the wheel slide is being translated by manual control means or by power actuated means; the manual means being utilized largely during setting up of the machine, while the automatic means is employed during actual grinding operation for controlling and effecting the reverse translations of the wheel relative to the work. The manual means for shifting the valve will first be described since the parts are shown in the drawings in positions for manual actuation.

Accordingly, the pilot valve member 366 is connected at 380 to a rod 381 mounted for sliding movement in a bearing 382 provided by the valve block casing 295 and in a bearing 383 provided by the valve actuating mechanism housing 300. The rod 381 is connected with the spring abutment 330 and is shifted directly by the handle 312. - It is the lost motion between the spring abutment 329 and 330 and the bearing bosses 331 and 332 which is employed for shifting the valve member 366 to its operative positions; the initial motion of the handle 312 therefore being used to shift the valve member 366 and determine the direction of translation of the grinding wheel.

The power means for shifting the pilot valve member 366 includes the rack teeth 384, see Figure 14, on the rod 381 which mesh with a pinion 385 keyed or otherwise secured to a shaft 386 rotatably journaled in bearings provided by the valve block casing 295, see Figure 19. The pinion 385 is in effect formed on a sleeve 387 which additionally has formed thereon an elongated pinion 388. Meshing with the teeth of the pinion 388 at diametrical points and in offset relation is a pair of plungers 389 and 390 mounted for sliding movement in bearings provided by the valve block casing 295. The plungers 389 and 390 project beyond the face of the casing 390 and terminate in wedge or cam shaped ends respectively shown at 391 and 392 in Figure 14. The plungers 389 and 390 are adapted to be actuated by suitable dogs, such as 393, mounted in a dog carrier 394 on the disc 395. The disc 395 is adapted to be rotated in timed relation with the travel of the grinding wheel axially of the bed, and the dog carrier 394 is adjustable relative to the disc 395 whereby they may be set to engage the plunger ends 391 and 392 in accordance with the particular length of the work being operated upon. It is believed that the operation of the pilot valve member 366 by the automatic means is self-evident since a movement of one of the plungers 389 or 390 by the dog 393 in one direction will shift the pilot valve member through the pinion 385, while the reverse movement of the other plunger member will, through the same train, reversely shift the pilot valve member 366.

The means for rotating or actuating the disc 395 and therefore the dogs carried thereby is shown in Figures 3 and 4 and comprises a sprocket chain 396 having one end anchored to a plate 397 at the left hand end of the guide ways for the translatable table as seen in Figures 3 and 4 and having the other end anchored in plate 398 at the other end of the said guide ways. Intermediate its ends the chain 396 passes under a pair of idler rollers 399 and 400 journaled on the under surface of the slide 57. Between the rollers 399 and 400 the chain passes around a large sprocket 401 secured to the outer end of a shaft 402, see Figure 3. The shaft 402 is rotatably journaled in the walls of a gear box 403 interiorly of which the said shaft has secured thereto a bevel gear 404. The bevel gear 404 meshes with a second bevel gear 405 on the inner end of a shaft 406 journaled in the walls of the box 403 and projecting beyond said wall. It is to the projection of said second shaft 406 that the dog disc 395 is secured. From the foregoing it will be seen that as the slide, and parts carried thereby, are translated the chain 396 effects the rotation of the gear or sprocket 401 which through the bevel gears 404 and 405 rotates the dog disc 395.

Continuing with the description of the hydraulic circuit the reversing valve mechanism 290 is shown structurally in Figure 24 and comprises a valve bushing 407 through which is formed a plurality of radial ports 408, 409, 410, 411, 412, 413 and 414, each set being encircled by a similar circumferential groove 415 formed in the exterior of the bushing 407. Disposed in the bore in the bushing 407 is the pressure actuated valve member 416 having formed thereon piston portions 417, 418 and 419 providing between them cannelures for connecting the ports in different combinations, depending upon the position of the valve member. The ends of the bushing bore are enlarged as at 420 and 421 to form chambers respectively closed by plugs 422 and 423. As seen in Figure 28, the end ports 408 and 414, which respectively empty into the chambers 421 and 420, have respectively connected therewith the conduits 379 and 378 from the pilot valve mechanism 340. The ports 409 and 413 have respectively connected therewith branch discharge conduits emptying into pipe or conduit 424, in turn connected with pipe or conduit 425 terminating at its other end in the selector valve mechanism 231. The ports 411 have connected therewith the end or terminus of conduit 289 extending from the stop and manual throttle valve mechanism 267, while the remaining ports 410 and 412 have con-

casing 300 and the said stud has additionally secured thereto a lever 466. The lever 466 has its ball end 467 disposed in a circumferential groove 468 formed in rod 315 slidably mounted in the housing 300 for movement in a direction at right angles to the direction of extent of the rod 460. As was described above, the rod 315 has mounted thereon the actuator 314 and relative to which it is slidable, the said sliding movement of the rod being effected by the handle 312 being connected thereto by a bolt 470 which passes through a pair of diametrically disposed elongated apertures 471 formed in the actuator 314. From this it will be seen that oscillation of the lever 312 about its pivot 313 toward the right will shift the rod 315, which, through the levers 466 and 463 axially shifts the rod 460 and the selector valve member 448. In order to hold the said valve member in either of its operative positions the rod 460 is provided with a pair of V notches 472 cooperating with a spring pressed detent 473, the effectiveness of which it is believed is readily understood.

The balanced valve mechanism 455 is shown structurally in Figure 24 and comprises a valve bushing 474 through which is formed a plurality of radial ports 475, 476, 477, 478, 479 and 480, each set being encircled by a similar circumferential groove 481. Disposed within the bore in the valve bushing 474 is a balanced valve member 482 having formed thereon piston portions 483, 484 and 485 forming between them cannelures for connecting the ports 476 and 477 with one another and ports 478 and 479. The central piston portion 484 has projecting from opposite sides thereof collars 486 and 487 respectively forming restricted outlet orifices 488 and 489 respectively for the ports 477 and 478.

The balanced valve mechanism 455 is adapted to maintain relatively constant the forward and back pressures in the system for the motor 428. The exhaust pipe or conduit 454 is therefore connected to the ports 476, while the ports 477 are connected by a pipe or conduit 490 with the throttle valve mechanism 458. For this reason also the pipe or conduit 457 is connected with the ports 479 of the balanced valve mechanism 455, while the ports 478 have connected therewith a pipe or conduit 491 which terminates in the throttle valve mechanism 458. The ports 480 have connected therewith one end of the pipe or conduit 492, which has its other end connected in the pipe or conduit 490 and the pipe 492 includes a choke coil or hydraulic resistance 493 while the ports 475 have connected therewith one end or terminus of a pipe 494 having its end connected in the pipe or conduit 491 and containing a choke coil or hydraulic resistance 495. The operation of this valve mechanism is to maintain the pressure in the pipes or conduits 454 and 457 as established by the throttle valve mechanism 458 and its operation will be described in detail later.

The throttle valve mechanism 458 is shown structurally in Figure 14 and comprises a valve bushing 496 through which is formed a plurality of sets of radial ports 497, 498 and 499, each set of ports being encircled by a similar circumferential groove 500 formed in the exterior of the bushing 496. It will be appreciated from Figure 14 that the ports 498 are of considerable length and, it should be noted, of relatively narrow width.

Disposed in the bore in the bushing 496 is a valve member 501 having formed thereon piston portions 502, 503 and 504 of which the piston portions 502 and 503 are connected by a stem portion 505 of a diameter slightly less than the diameter of the pistons to form a restricted orifice 506, while the piston portions 503 and 504 are connected by a similar stem portion 507 to provide the restricted orifice 508. It will be noted that the piston portion 503 is of a width considerably less than the length of the ports 498.

By reference to Figure 28 it will be noted that the ports 497 have connected therewith the other terminus of the pipe or conduit 490 extending from the balanced valve mechanism 455 while the ports 499 have connected therewith the other terminus of the pipe or conduit 491 also extending from the balanced valve mechanism 455. The ports 498 have connected therewith one terminus of a pipe or conduit 509 which terminates at its other end in the pipe or conduit 287 and therefore the sump or tank 100. Depending upon the position of the piston portion 503 with respect to the ports 498 depends the rate of operation of the motor 428 and therefore the rate of travel of the grinding wheel axially with respect to the work piece.

The throttle valve member 501 is adapted to be adjustably set with respect to its valve bushing and is therefore connected at 510 with a rod 511 mounted in a bearing in the valve block casing and a second bearing provided by the housing 300. As seen in Figure 15 the rod 511 projects into the housing 300 and abuts the upper end of a lever 512 pinned or otherwise secured to a rod 513, see Figure 16. The rod 513 is oscillatably journaled in a bearing formed in the housing web 322 and projects therebeyond to receive the forked lever 514 as seen in Figures 15 and 16. The forked lever 514 received between the arms thereof a pin 516 projecting from the lower end of an arm 517 oscillatably mounted on a pivot pin 518 projecting from one wall of the housing 300. The arm 517, in addition, rotatably carries intermediate its ends a roller 519 riding on the periphery of a cam 520 within the housing 300.

The cam 520 is utilized only during a half of a revolution thereof and has its periphery 521 rising substantially from 522 to the point 523. It will be appreciated that as the cam is advanced the arm 517 will be oscillated toward the left as seen in Figure 15 to more or less shift the rod 511 and therefore shift the position of the piston portion 503 of throttle valve member 501 relative to the ports 498 for permitting the desired opening of the said ports on either side of the said central piston portion.

In order to adjust the position of the said cam 520 it is secured to one end of a shaft 524 rotatably journaled in bearings provided by the walls of the housing 300. The other end of the shaft 524 projects beyond one of the walls of said housing to receive a lever 525 carrying at one end a spring pressed locking pawl 526. The inner end of the pawl 526 is adapted to cooperate with serrations or teeth 527 on a dial plate 528 with which the handle or lever 525 also cooperates to indicate the position of the cam and rate of feed. It should be noted that as the handle 524 is actuated in a counterclockwise direction as seen in Figure 18 the cam 520 is advanced to further open the throttle valve, thereby, as will be clear, increasing the rate of translation of the slide and parts carried thereby.

It should be noted that the valve member 277 must be shifted to the open or running position prior to the operation of the slide and this is accomplished through power means. The means for opening this valve is shown diagrammatically in Figure 28 by the hydraulically actuated plunger indicated in general by the reference numeral 529. This means is shown structurally in Figure 22 and comprises a plunger 530 mounted in the bore in a bushing 531 pressed into a bore in the valve block 270. At the end of the piston plunger 530 there is provided a chamber 532 from which extends radial ports 533. The ports 533 communicate with a circumferential groove 534 formed in the exterior of the bushing 531. At its outer end the plunger 530 abuts a pin or finger 535 projecting upwardly from the sleeve 293 from which depends the arms 292 and 296, the former of which is at all times in contact with the valve member 277. By reference to Figures 22, 23 and 24 it will be seen that if pressure were introduced into the chamber 532, the plunger 530 will be actuated to the right, thereby correspondingly shifting the pin or finger 535 and oscillating the sleeve 293 in a clockwise direction. The movement of the sleeve 293 carries with it the arms 292 and 296 wherefore the former shifts the valve member 277 to close off the ports 274 and open the ports 272.

In order to provide the hydraulic pressure in the chamber 532 the ports 533 and their circumferential groove 534 are connected, as seen in Figure 28, by a pipe or conduit 536 with the pipe or conduit 457 from the selector valve mechanism 231.

The operation of the automatic means for translating the slide 57 and therefore the grinding wheel axially of the work is as follows:

The hydraulic pressure is established in the conduit 262 by the pump 260 which passes through the reducing valve mechanism 265 out of the valve mechanism 340 to reversing valve mechanism 290 for positioning reverse valve member. The starting handle 312 is then grasped and actuated in a clockwise direction about the pivot 313 for axially shifting the rod 315. The rod 315 through the arms 466 and 463 axially shifts the selector valve rod 460 for shifting the selector valve member 448 to the left as seen in the drawings and thereby connect conduit 425 with conduit 454 and conduit 268 with conduit 457 and conduit 230 with the conduit 456 and the sump or tank 100. The pressure in the conduit 262 then flows through the conduit 268 and conduit 457 to and through the conduit 536 for actuating the plunger 530 and through the pin 535, sleeve 293 and arm 292 shifts the stop and manual control throttle valve member 277 to the left as seen in the drawings. This then establishes communication between the pressure conduit 266 and conduit 289 to the reversing valve mechanism 290.

Either prior to the shifting of the parts as just described, or at this time, the cam 520 is adjusted through lever 525 to the desired position, depending upon the rate at which the slide and grinding wheel is to be translated. In order to determine this rate of translation the dial plate 528 may be provided with suitable indicia indicating the desired rate.

The handle 312 is then shifted slightly in a direction opposite to that for shifting the selector valve member for shifting the pilot valve member 366 and initiating the movement of the slide and grinding wheel in the desired direction, which as above described, is the direction in which the handle 312 is moved.

The translation of the slide 57 and grinding wheel through the sprocket chain 396 and transmission operated thereby effects the rotation of the disc 395 and the dogs mounted thereon. The slide will therefore continue to move until one of the dogs 393 engages with either plunger nose 391 or 392 for shifting same, which, through the pinions 388 and 385, shifts the pilot valve rod 381 and therefore pilot valve member 366 to the reverse position. This movement of the pilot valve member connects the hydraulic medium with the opposite side of the reversing valve member 416 to shift same to its opposite position, thereby reversing the direction of translation of the slide and grinding wheel, which again continues in the said reverse direction until the other of the dogs 393 acting on the other of the plungers causes the slide to travel in the initial direction.

The rate of translation of the slide is effected by determining how much of the hydraulic medium is being used and how much is being returned to the sump or tank, this division of the fluid being determined by the position of the piston portion 503 relative to the ports 498. The nearer the said piston portion 503 is to the right hand end of the ports 498 the more fluid will be employed, while the nearer the said piston portion is to the left hand end of said ports the less fluid is being used and it is this amount of fluid that is actually being used which determines the rate, the more fluid the faster the rate. The flow of the hydraulic medium is by way of conduits 262, 268, 457, 491 and 500, the latter connection being made through the throttle valve bushing 496 and that portion of the ports 498 to the right of the piston portion 503. The exhaust flow is through the exhaust conduit from the reversing valve mechanism 290 through the conduits 454, 490, 509 and 287 to the sump or tank 100, the connection with conduit 509 being made through the throttle valve bushing 496 and that portion of the ports 498 to the left of the piston portion 503.

In order to maintain this division the flow before entering the throttle valve mechanism 458 is through the balanced valve mechanism 455. For this reason the exhaust fluid from the system which is flowing through the conduit 454 is connected to the right hand end of the balanced valve member by way of the conduit 492 while the excess of non-used fluid flowing through the conduit 457 is connected with the left hand end of the valve member by way of conduit 494. Should the slide 57 and the grinding wheel carried thereby attempt to travel at a rate in excess of that desired, as effected by the setting of the throttle valve, this increased flow in the exhaust line would be communicated through the conduit 492 and choke 493 to the right hand end of the valve member which would immediately be shifted to the left to close off the ports 477 and thereby choke down the flow and set up a greater back pressure. This reduction in the flow of the hydraulic medium would cause a lowering of the pressure on the right hand end of the balanced valve member, whereupon it will shift to its normal desired position. In the event a higher work resistance were encountered and the slide and grinding wheel rate of travel were cut below that established by the throttle valve mechanism an increased flow of fluid through the conduit 457 would immediately take place which would be communicated to the left hand end of the throttle valve member by way of the pipe or conduit 494 and choke 495 for at this time shifting the throttle valve member to the right for closing off the ports 478. The decreased flow which would follow would decrease the pressure on the left hand end of the valve member causing same to again centralize or position itself in accordance with the setting of the throttle valve member. When it is desired to stop the further shifting of the slide and grinding wheel the handle 312 is shifted to the position shown in Figure 16 or in a counter-clockwise direction about the pivot pin 313 which again connects the conduits 268 and 230 with one another and connects the conduit 457 with the conduit 456 and therefore the sump or tank 100 and simultaneously connects the conduit 536 of the plunger mechanism 529 with the sump or tank 100. The spring 306 behind the selector and manual throttle valve member 277 then shifts the said valve member to the position shown in the drawings for cutting off communication between the conduit or pipe 266 and the conduit or pipe 289 and connecting said conduit or pipe 266 with the sump through the conduits 286 and 287.

It is frequently desirable or necessary to camber or crown the surface of the rolls while being operated upon, for which purpose the grinding wheel is actuated toward and from the center of the work during the relative axial travel thereof. This is effected by oscillating the grinding wheel carried by the axis of the trunnion 65 by what is known as a cambering attachment. As shown in the drawings, this cambering attachment comprises a supporting base 537 shown in Figure 2 as disposed behind the bed 31 and secured thereto. The base 537, see Figure 9, has welded or secured thereto a plate 538 extending substantially the length thereof and supporting for adjustment relative thereto a carriage 539. The carriage 539, as seen in Figure 13, has journaled therein at a point substantially midway of its length a pinion shaft 540 having secured to its inner end a pinion 541 and having its outer end 542 projecting beyond the carriage in order to receive a wrench or the like whereby the shaft will be rotated. The pinion 541 meshes with the teeth of a rack bar 543 secured to the plate 538. From the foregoing it will be noted that rotation of the shaft 540 and pinion 541 will cause same, together with the carriage, to be traversed relative to the base 537.

In order to secure the carriage 539 in its adjusted positions it has projecting from the sides thereof flanges 544 cooperating with gibs 545 extending along the sides of the carriage and secured to the plate 538 by suitable clamping bolts 546.

The carriage 539 is provided at spaced intervals throughout its length with bores or apertures 547 and 548 adapted to receive respectively supporting and bending pins 549 and 550. The pins 550 which are disposed in the apertures 548 support a cam bar 551 disposed within a slot 552 in the carriage 539. The pins 549 are disposed in the apertures 547 and contact the upper surface of a lug 553 projecting from one side of the bar 551 as clearly shown in Figure 9.

In practice, two pairs of pins 549 and 550 are employed, one pair being disposed in the aperture at one end, the left for example, as seen in Figure 8, while the other pair is disposed in aperture at the other end of the carriage. This would be true if the roll were of a length equal to the length of the cambering bar and it were desired to provide the camber throughout the length of the roll. If, however, a portion of the roll intermediate its ends only were to be cambered or a roll of a length less than the maximum length of the bar were to be cambered the said pairs of supporting and bending pins would be inserted in the apertures between the extreme end ones.

In order to effect the camber the bar 551 is adapted to be bent or sprung either upwardly or downwardly relative to the supporting and bending pins, depending upon whether a concave or convex camber is to be formed on the work. The means for effecting the springing of the bar is shown in cross section in Figure 10 and comprises a screw 554 having its lower end threaded into the carriage, there being, for example and as shown in Figure 8, two such screws between each pair of apertures 547 and 548. Mounted on the screw 554 is a bending shoe 555 having formed therein a slot 556 receiving the lug 553 of the bar 551. By reference to Figures 9 and 10 it will be seen that with the bar 551 supported at two points by the pins 550 a downward screwing of the screw 554 will cause the bar to be deflected between said pins, while an upward screwing of the screw 554 will convex the bar between the spaced pins 549 which contact with the upper surface of the lug 553.

The contour of the bar 551 is communicated to the grinding wheel carriage and therefore the grinding wheel through a shoe 557 riding on the upper surface of the bar 551 and connected through a pin and slot connection 558 to the outer end of an L-shaped arm 559. The arm 559 is connected to the tapered nose 560 of a square shaft 561 rotatably journaled at one end in anti-friction bearings 561' supported by a bearing box 562 secured to the slide 57 and at the other end in bearing blocks 563 and 564. The bearing blocks 563 and 564 are integral with a bracket 565 secured to the under side of the transversely shiftable slide 63. Between the bearing blocks 563 and 564 there is an actuating member 566 on which is formed a ledge or shelf 567. Disposed on the ledge 567 is a pillow block 568 contacting on its upper end with the lower edge of a spline shaft 569 integral with screw member 570.

From the foregoing it will be noted that with the bar 551 locked against axial movement and a traversing of the slide 57 and parts carried thereby, the shoe on riding on the upper surface of the bar 551 will either be raised or lowered depending upon the contour of the cam surface. This movement of the shoe 557 correspondingly actuates the L-shaped arm 559 for oscillating the square bar 561 and the actuator member 566. This oscillation of the member 566 through the pillow block 568 raises the screw 570 which because it is connected to the carriage 66, as will later be described, causes the oscillation of said carriage about the trunnions 65.

As will be seen in Figure 6, the screw 570 is threaded into a sleeve 571 which acts as a nut and is rotatably mounted in anti-friction bearings supported by the carriage 66, the sleeve 571 being secured to said bearings and the carriage 66 against any axial movement by lock nuts 572 disposed at opposite ends thereof. The sleeve 571 has secured thereto or integral therewith and surrounding same a worm wheel 573 meshing with the threads of a worm 574, in turn secured to or integral with a worm shaft 575, see Figure 12. The shaft 575 is rotatably journaled in bearings provided by the carriage 66 and extends beyond the walls of said carriage to receive a gear 576 meshing with a second gear or pinion 577 on a shaft 578. The shaft 578 is rotatably mounted in a bracket 579 secured to the side of the carriage 66 and forming a housing interiorly of which is disposed the reduction gearing 576 and 577. The shaft 578 extends beyond the bracket 579 to receive a hand wheel 580 whereby the said shaft is rotated, which through the reduction gearing and worm and worm wheel 574 and 573, effect the rotation of the sleeve nut 571. To prohibit the rotation of the screw 570 the spline portion 569 thereof is received in a keywayed aperture in the bracket 581 secured to the under surface of the carriage 66.

It will now be seen that oscillation of the bar 561 and actuator 566 carried thereby effects the axial movement of the screw 570 and since said screw is connected to the carriage 66 against any independent axial movement the said carriage is oscillated thereby. As was noted above, the cam bar shoe 557 is connected to the L-shaped arm 559 by the pin and slot connection 558. The lost motion effected by this connection is increased or decreased through a plug 582 threaded through the arm 559 and contacting with the shoe at a point opposite to that riding on the cam bar. In the event that it is desired not to use the cambering mechanism it is only necessary to back away the screw plug 582 to provide sufficient lost motion in the pin and slot connection 558 so that the arm 559 is not oscillated thereby.

In order to effect fine infeed movements of the grinding wheel and work, as well as to take up the wear on the grinding wheel, the worm wheel 573 is rotated, thereby rotating the sleeve nut 571 and axially shifting the screw 570 relative thereto, the reaction through the screw being taken by the pillow block 568 which, in addition to riding on the ledge 567 of the actuator 566, rides on similar ledges formed on the bearing blocks 563 and 564.

It is believed that from the foregoing description the complete operation of the improved precision grinding machine will be understood. It is also believed that it will be appreciated that there has been provided a massive precision grinding machine incorporating all of the movements desired in such a machine, but frequently not found therein except in very small sizes thereof. It will be noted that the grinding wheel and work are adapted to have imparted thereto relatively axial movement, both coarse and fine, the former at slow and rapid rates and the latter at infinitely variable feed rates. It will also be noted that the grinding wheel and work may be fed relatively to one another at rapid and slow rates as well as cyclically depending upon the nature and type of work being operated upon.

What is claimed is:

1. In a grinding machine of the class described the combination of a work support, a grinding wheel support, one of said supports being self-contained and supporting a hydraulic medium, a pair of pumps for circulating the medium, hydraulic means operated by the medium circulated by one of said pumps for effecting an axial movement of said support relative to the other support, and additional hydraulic means operated by said second circulating pump for effecting a transverse movement of the support toward and from the other support.

2. In a grinding machine of the class described the combination with a work support, and a grinding wheel support, of means for actuating one of said supports toward the other, means for locking said support, means operable for sequentially unlocking said support, effecting its movement and locking said support at the conclusion of the movement, means for determining the rate of actuation of the support during its movement, a manually operable lever connected with the rate determining means and indicating the direction of movement of the support and its rate of movement by the direction in which it is moved and the amount of movement thereof, and yielding means for returning the lever to a stop position and effecting a stopping in the movement of the support upon release thereof.

3. In a grinding machine of the class described the combination with a work support and a grinding wheel support, a slide for translating the grinding wheel axially of the work and itself, a second slide mounted on and movable transversely of the first slide for actuating the grinding wheel toward the work, a pivotally mounted carriage for the grinding wheel on the second slide, independent hydraulic motors for actuating the two slides in their respective directions of movement, and means operable on the grinding wheel carriage to effect its oscillation during the translation thereof.

4. In a grinding machine of the class described the combination of a work support, a grinding wheel, a translatable slide for the grinding wheel to effect a translation thereof axially of itself and the work, a second slide mounted on the translatable slide for actuating the grinding wheel toward and from the work, independent hydraulic motors for effecting the actuation of the transverse and translatable slides in their respective directions, independent control means for said motors mounted on said translatable slide, the control means for the transversely shiftable slide including a reversing valve, a rate control valve, and a lever pivotally mounted on the translatable slide for sequentially actuating the reversing valve in either direction and the rate control valve in a single direction.

5. In a grinding machine of the class described the combination of a work support, a grinding wheel, a translatable slide for the grinding wheel to effect a translation thereof axially of itself and the work, a second slide mounted on the translatable slide for actuating the grinding wheel toward and from the work, independent hydraulic motors for effecting the actuation of the transverse and translatable slides in their respective directions, independent control means for said motors mounted on said translatable slide, the control means for the transversely shiftable slide including a reversing valve, a rate control valve, a lever pivotally mounted on the translatable slide for sequentially actuating the reversing valve in either direction and the rate control valve in a single direction, and hydraulically actuated means for normally locking the transversely shiftable slide in position.

6. In a grinding machine of the class described the combination of a work support, a grinding wheel, a translatable slide for the grinding wheel to effect a translation thereof axially of itself and the work, a second slide mounted on the translatable slide for actuating the grinding wheel toward and from the work, independent hydraulic motors for effecting the actuation of the transverse and translatable slides in their respective directions, independent control means for said motors mounted on said translatable slide, the control means for the transversely shiftable slide including a reversing valve, a rate control valve, a lever pivotally mounted on the translatable slide for sequentially actuating the reversing valve in either direction and the rate control valve in a single direction, hydraulically actuated means for normally locking the transversely shiftable slide in position, and a connection between the reversing valve and hydraulic locking means for effecting the unlocking of the slide prior to the actuation thereof and effecting a locking of the slide at the conclusion of said actuation.

7. In a grinding machine of the class described the combination of a bed, a translatable slide mounted thereon, a second slide on the translatable slide for transverse movement relative thereto, a grinding wheel carriage pivotally mounted to the second slide, independent hydraulic motors for effecting the movement of the translatable and transversely movable slides, means operable during the translation of the slides for oscillating the carriage, a grinding wheel spindle in the carriage, a grinding wheel secured to the spindle, and means for axially reciprocating the grinding wheel and its spindle relative to the carriage.

8. In a grinding machine of the class described the combination of a bed, a translatable slide mounted thereon, a second slide on the translatable slide for transverse movement relative thereto, a grinding wheel carriage pivotally mounted to the second slide, independent hydraulic motors for effecting the movement of the translatable and transversely movable slides, means operable during the translation of the slides for oscillating the carriage, a grinding wheel spindle in the carriage, a grinding wheel secured to the spindle, means for axially reciprocating the grinding wheel and its spindle relative to the carriage, and independent control means for each of the hydraulic motors and for effecting the axial movement of the spindle mounted on the translatable carriage.

9. In a grinding machine of the class described the combination of a bed, a translatable slide mounted thereon, a second slide on the translatable slide for transverse movement relative thereto, a grinding wheel carriage pivotally mounted to the second slide, independent hydraulic motors for effecting the movement of the translatable and transversely movable slides, means operable during the translation of the slides for oscillating the carriage, a grinding wheel spindle in the carriage, a grinding wheel secured to the spindle, means for axially reciprocating the grinding wheel and its spindle relative to the carriage, independent control means for each of the hydraulic motors and for effecting the axial movement of the spindle mounted on the translatable carriage, and an operator's station on the translatable slide adjacent the independent controls for the translatable and transversely movable slide and spindle shifting means.

10. In a grinding machine of the class described the combination with a work support and a wheel support, of an hydraulic motor for effecting the translation of one of said supports, and control means therefor whereby the said support may be automatically translated and reversed at each end of its movement or may be manually controlled and reversed at each end of its movement comprising an hydraulic circuit having a pair of control valves therein, one of which is presettable to determine the rate of translation and the other of which is manually actuable to directly vary the rate in accordance with the manual varying of the position thereof during translation, and a selector valve mechanism in the hydraulic circuit for determining which of the rate control valves is to be employed.

11. In a grinding machine of the class described the combination with a work support and a wheel support, of an hydraulic motor for effecting the translation of one of said supports, and control means therefor whereby the said support may be automatically translated and reversed at each end of its movement or may be manually controlled and reversed at each end of its movement comprising an hydraulic circuit having a pair of control valves therein, one of which is presettable to determine the rate of translation and the other of which is manually actuable to directly control the rate in accordance with the manual actuation thereof, a selector valve mechanism in the hydraulic circuit for determining which of the rate control valves is to be employed, and a manually actuable lever movable through paths at right angles to one another for actuating the selector valve to select the desired throttle valve and to actuate the manually adjustable throttle valve to determine the rate of actuation of the support.

12. In a grinding machine of the class described the combination with a work support and a wheel support, of an hydraulic motor for effecting the translation of one of said supports, and control means therefor whereby the said support may be automatically translated and reversed at each end of its movement or may be manually controlled and reversed at each end of its movement comprising an hydraulic circuit having a pair of control valves therein, one of which is presettable to determine the rate of translation and the other of which is manually actuable to directly control the rate in accordance with the manual actuation thereof, a selector valve mechanism in the hydraulic circuit for determining which of the rate control valves is to be employed, a manually actuable lever movable through paths at right angles to one another for actuating the selector valve to select the desired throttle valve and to actuate the manually adjustable throttle valve to determine the rate of action of the support, a direction control valve in the circuit, and means whereby the movement of the lever in the direction to translate the support effects the operation thereof.

13. In a grinding machine of the class described the combination with a work support and a grinding wheel support, one of which is stationary and the other is translatable, an hydraulic motor for effecting said translation, a control mechanism whereby the said translation is effected automatically between certain limits and is automatically reversed, a second control mechanism whereby the translation of the support is manually effected between the desired limits of travel and manually reversed, a selector mechanism for determining which of the control mechanisms is to be employed, each of said control mechanisms including a rate control mechanism, means for presetting the rate control mechanism of the automatic control means, and manually actuable means for varying the rate control means of the manual control mechanism during translation of the support.

14. In a grinding machine of the class described the combination with a work support and a grinding wheel support, one of which is stationary and the other is translatable, an hydraulic motor for effecting said translation, a control mechanism whereby the said translation is effected automatically between certain limits and is automatically reversed, a second control mechanism whereby the translation of the support is manually effected between the desired limits of travel and manually reversed, a selector mechanism for determining which of the control mechanisms is to be employed, and a manually actuable lever movable through a first path for effecting the operation of the selector mechanism and movable through a second path at an angle to the first for effecting operation of the second control mechanism.

15. In a grinding machine of the class described the combination with a work support and a grinding wheel support, one of which is stationary and the other is translatable, an hydraulic motor for effecting said translation, a control mechanism whereby the said translation is effected automatically between certain limits and is automatically reversed, a second control mechanism whereby the translation of the support is manually effected between the desired limits of travel and manually reversed, a selector mechanism for determining which of the control mechanisms is to be employed, a manually actuable lever movable through a first path for effecting the operation of the selector mechanism and movable through a second path at an angle to first for effecting operation of the second control mechanism, a reversing mechanism for the hydraulic motor and means connecting the reversing mechanism with the manually actuable lever whereby movement of the lever in its second path effects the operation thereof.

16. In a grinding machine of the class described the combination with a work support and a grinding wheel support, one of which is stationary and the other is translatable, an hydraulic motor for effecting said translation, a control mechanism whereby the said translation is effected automatically between certain limits and is automatically reversed, a second control mechanism whereby the translation of the support is manually effected between the desired limits of travel and manually reversed, a selector mechanism for determining which of the control mechanisms is to be employed, a manually actuable lever movable through a first path for effecting the operation of the selector mechanism and movable through a second path at an angle to the first for effecting operation of the second control mechanism, a reversing mechanism for controlling the direction of the translation of the support, and a connection between the lever and the reversing mechanism whereby its actuation through its second path of movement effects the operation thereof and dog actuated means for effecting the operation of the reversing mechanism independent of the operation thereof by the lever.

17. In a grinding machine of the class described the combination with a work support and a grinding wheel support, one of which is stationary and the other is translatable, an hydraulic motor for effecting said translation, a control mechanism whereby the said translation is effected automatically between certain limits and is automatically reversed, a second control mechanism whereby the translation of the support is manually effected between the desired limits of travel and manually reversed, a selector mechanism for determining which of the control mechanisms is to be employed, a manually actuable lever movable through a first path for effecting the operation of the selector mechanism and movable through a second path at an angle to the first for effecting operation of the second control mechanism, a reversing mechanism for controlling the direction of the translation of the support, a connection between the lever and the reversing mechanism whereby its actuation through its second path of movement effects the operation thereof and dog actuated means for effecting the operation of the reversing mechanism independent of the operation thereof by the lever, including a rotatable disc, dogs adjustably secured thereto, a sprocket chain having its ends fixed at the maximum limits of travel of the support, and a transmission between the sprocket chain and dog carrying disc whereby translation of the support effects the rotation of the disc and the dogs.

18. In a machine of the character described, the combination with a pair of translatable supports, hydraulic mechanism including individual pumps and motors for effecting translation of the respective supports, means inter-connecting the output sides of the pumps whereby the pumps may be additively employed, means for automatically clamping one of the supports against translation, and an interlock effective to prevent additive employment of the pumps when the clamping means are in released position.

19. In a machine of the character described, the combination with a pair of translatable units, individual pump means for effecting translation of the units, hydraulic means for clamping one of said units against translation, a valve additively coupling the output of the actuating pump for said unit with the output of the pump for the second unit, and an interlock between the clamping device and said valve for shifting the valve into coupling position when the clamp is effective.

20. In a machine of the character described, the combination with a pair of translatable units, of individual hydraulic motors for effecting translation of the units, pump means, hydraulic conduits for directing an hydraulic medium from the pump to one of the units for effecting a translation thereof, means for clamping said unit against translation, and means effective on clamping of the unit for coupling the pressure conduit from the pump to the motor of the second translatable unit for actuation of the latter.

21. In a machine of the character described, the combination with a pair of translatable units, of individual hydraulic motors for effecting translation of the units, pump means, hydraulic conduits for directing an hydraulic medium from the pump to one of the units for effecting a translation thereof, means for clamping said unit against translation, means effective on clamping of the unit for coupling the pressure conduit from the pump to the motor of the second translatable unit for actuation of the latter, and individual means for determining the rates of translation of the respective units.

WILLETTS PEASLEE.
    LESTER F. NENNINGER.
    ERWIN G. ROEHM.